US009454326B1

(12) United States Patent
Bono et al.

(10) Patent No.: US 9,454,326 B1
(45) Date of Patent: Sep. 27, 2016

(54) FILE METRO CLUSTER FOR SITE FAILOVER OF DATA STORAGE SYSTEM

(71) Applicant: EMC Corporation, Hopkinton, MA (US)

(72) Inventors: Jean-Pierre Bono, Westborough, MA (US); Scott W. Keaney, Dedham, MA (US)

(73) Assignee: EMC Corporation, Hopkinton, MA (US)

( * ) Notice: Subject to any disclaimer, the term of this patent is extended or adjusted under 35 U.S.C. 154(b) by 411 days.

(21) Appl. No.: 13/854,114

(22) Filed: Mar. 31, 2013

(51) Int. Cl.
G06F 3/06 (2006.01)
G06F 13/00 (2006.01)
G06F 12/08 (2016.01)

(52) U.S. Cl.
CPC ............. *G06F 3/065* (2013.01); *G06F 3/0689* (2013.01); *G06F 12/0815* (2013.01)

(58) Field of Classification Search
CPC ........... G06F 11/1076; G06F 11/1461; G06F 3/0617; G06F 2212/202; G06F 3/0656; G06F 12/00; G06F 17/30303; G06F 17/30578; G06F 17/30581; G06F 3/0605; G06F 3/0613; G06F 3/0638; G06F 3/064; G06F 3/0659; G06F 11/0751
USPC ....................................................... 711/114
See application file for complete search history.

(56) References Cited

U.S. PATENT DOCUMENTS

| 7,631,155 | B1 * | 12/2009 | Bono et al. ............... 711/156 |
| 7,752,180 | B1 * | 7/2010 | Fair et al. ............... 707/690 |
| 7,882,386 | B1 | 2/2011 | Potnis et al. |
| 8,392,680 | B1 | 3/2013 | Natanzon et al. |
| 8,433,869 | B1 | 4/2013 | Natanzon et al. |
| 8,478,955 | B1 | 7/2013 | Natanzon et al. |
| 8,521,691 | B1 | 8/2013 | Natanzon |
| 8,521,694 | B1 | 8/2013 | Natanzon |
| 2006/0004973 | A1 * | 1/2006 | Sardella et al. ............... 711/162 |
| 2011/0161291 | A1 * | 6/2011 | Taleck et al. ............... 707/622 |

OTHER PUBLICATIONS

VMware vSphere Metro Storage Cluster Case Study, VMware, May 2012.*

* cited by examiner

*Primary Examiner* — Tuan Thai
*Assistant Examiner* — Mohamed Gebril
(74) *Attorney, Agent, or Firm* — BainwoodHuang

(57) ABSTRACT

A technique for supporting failover between SPs at different physical sites includes operating a distributed data manager (DDM) in an IO stack of both a first SP at a first site and a second SP at a second site. The DDMs of the first and second SPs cooperatively function to provide LUN virtualization that preserves virtual LUN IDs such that the first SP and the second SP can each access the same virtualized LUNs using the same virtual LUN IDs. In the event of a failure at the first site, the second SP at the second site may access the virtualized LUNs originally accessed by the first SP, including those storing configuration and site-specific data for the first site, as if those LUNs were local to the second SP.

20 Claims, 12 Drawing Sheets

FILE METRO CLUSTER FOR SITE FAILOVER OF DATA STORAGE SYSTEM

BACKGROUND

Block-based data storage systems conventionally include programming and hardware structures to provide block-based access to storage volumes. Such systems may support Fibre Channel, iSCSI (Internet Small Computer System Interface), and/or other block-based protocols. With block-based protocols, a data storage system may receive IO (input/output) requests from "hosts," i.e., computing devices accessing the data storage system, where the IO requests specify locations to be read from or written to in the form of LUN identifiers (logical unit number, or volume) and particular offset ranges relative to the LUN. IOs that specify read requests map the specified LUNs and offsets to particular locations on disk drives or electronic flash drives, reads the data stored at the mapped locations, and returns the data to the hosts. IOs that specify write requests perform similar mappings, but write the data to the designated locations. The IO requests may return results indicating whether the write requests succeeded or failed. An example of a block-based data storage system is the CLARiiON® system from EMC Corporation of Hopkinton, Mass.

File-based data storage systems include programming and hardware structures to provide file-based access to file systems. File-based data storage systems are sometimes referred to as NAS (Network Attached Storage) systems. Such systems typically support NFS (Network File System), CIFS (Common Internet File System), SMB (Server Message Block), and/or other file-based protocols. With file-based protocols, hosts can issue read and write IO requests by specifying particular file systems, paths, and file names. Internally to the data storage system, file system directories map the files specified by the host IOs to particular sets of blocks on internal volumes, which themselves are derived from disk drives or electronic flash drives. The data storage system accesses the mapped locations and performs the requested reads or writes. An example of a file-based data storage system is the Celerra® system from EMC Corporation of Hopkinton, Mass.

Distributed storage system equipment provides what may be known as data federation including LUN virtualization, cache data coherency maintenance, and data mirroring. An example of such data federation equipment for block-based distributed storage is the VPLEX® system from EMC Corporation of Hopkinton, Mass.

SUMMARY

Conventional data storage systems support failover between local storage processors (SPs). If a first SP of a data storage system fails, operation can be resumed on a second SP of the same data storage system by reassigning ownership of LUNs originally assigned to the first SP to the second SP. As the second SP is connected to the same physical storage drives as the first SP, the second SP is able to take over operations originally performed by the first SP quickly and efficiently, generally with no disruptive impact to hosts accessing the data storage system.

Unfortunately, however, failover is often less efficient and/or more disruptive between different data storage systems located at different physical sites. Data storage systems typically store not only host data, but also configuration data and other site-specific data pertaining to their operation. Thus, for example, if a first site experiences a failure that affects the entire site, failover to a second site may be time consuming and disruptive. Not only does host IO processing need to be resumed at the second site, but also configuration and other site-specific data must be transferred. Failover between SPs at different sites is thus much more complex and difficult to achieve than failover between SPs of the same system.

In contrast with conventional failover schemes, an improved technique for supporting failover between SPs at different physical sites includes operating a distributed data manager (DDM) in an IO stack of both a first SP at a first site and a second SP at a second site. The DDMs of the first and second SPs cooperatively function to provide LUN virtualization that preserves virtual LUN IDs such that the first SP and the second SP can each access the same virtualized LUNs using the same virtual LUN IDs. The virtualized LUNs appear to be local to each SP, although they may in fact be local only to the first SP, only to the second SP, or to some other SP (e.g., a third SP, located at a third site). Also, in accordance with the improved technique, configuration and other site-specific data are themselves stored in virtualized LUNs managed by the DDMs. Thus, in the event of a failure at the first site, the second SP at the second site may access the virtualized LUNs originally accessed by the first SP, including those storing configuration and site-specific data for the first site. The second SP at the second site may take over ownership of various objects, such as VSPs (virtualized storage processors) previously owned by the first SP. Failover between different sites is thus achieved using substantially the same failover logic as is used between local SPs at the same site, and the previously locally-limited failover functionality is stretched across different sites, which may be located in different rooms, different buildings, or different cities. Also, because failover involves very few changes at the site that resumes operation, failover can be executed very quickly, in some cases nearly as quickly as failover can be executed between SPs located in the same system.

In an example, the first SP at the first site and the second SP at the second site are part of a wide area cluster, i.e., a metro cluster, of SPs. Each of the SPs in the metro cluster may operate a DDM in its respective IO stack and access a common set of virtualized LUNs. Thus, any SP in the metro cluster can respond to a failure in any other SP of the metro cluster to quickly and efficiently resume the operations of the failing SP.

In an example, the DDMs running in the IO stacks of the SPs also provide synchronous data mirroring between different SPs of the metro cluster, such that writes (e.g., both host IO writes and internally generated writes to update configuration/site-specific data) performed by one SP at one site are mirrored to an SP at another site. In an example, the DDMs running in the IO stacks of the SPs also provide cache coherency between the caches of different SPs within the metro cluster, such that the state of cache at one SP in the metro cluster is reflected in the cache of other SPs of the metro cluster. The combined effects of preserving LUN identities across SPs, mirroring of IOs, and maintenance of cache coherency ensure that any SP of the metro cluster is able to resume operation of a failing SP seamlessly and transparently.

Other embodiments are directed to computerized apparatus and computer program products. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same parts throughout the different views. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for supporting failover between SPs at different physical sites includes operating a distributed data manager (DDM) in an IO stack of both a first SP at a first site and a second SP at a second site. The DDMs of the first and second SPs cooperatively function to provide LUN virtualization that preserves virtual LUN IDs such that the first SP and the second SP can each access the same virtualized LUNs using the same virtual LUN IDs. In the event of a failure at the first site, the second SP at the second site may take over ownership of the virtualized LUNs originally owned by the first SP and access those same virtualized LUNs, including those storing configuration and site-specific data for the first site, as if those LUNs were local to the second SP.

First, an example unified datapath architecture will be described to illustrate an environment in which the described embodiments may be used. Second, particular improvements for managing file metro cluster failover will be described.

Environment of Unified Datapath Architecture:

A unified data path architecture for data processing in a data storage system combines both block-based and file-based functionality. This simplifies design and maintenance and allows a common set of functions to be applied to both block-based and file-based objects. The improved technique also increases storage utilization by reallocating storage units used for block-based objects to file-based objects, and vice-versa, thereby reducing or completely eliminating stranded storage.

Figure 1:
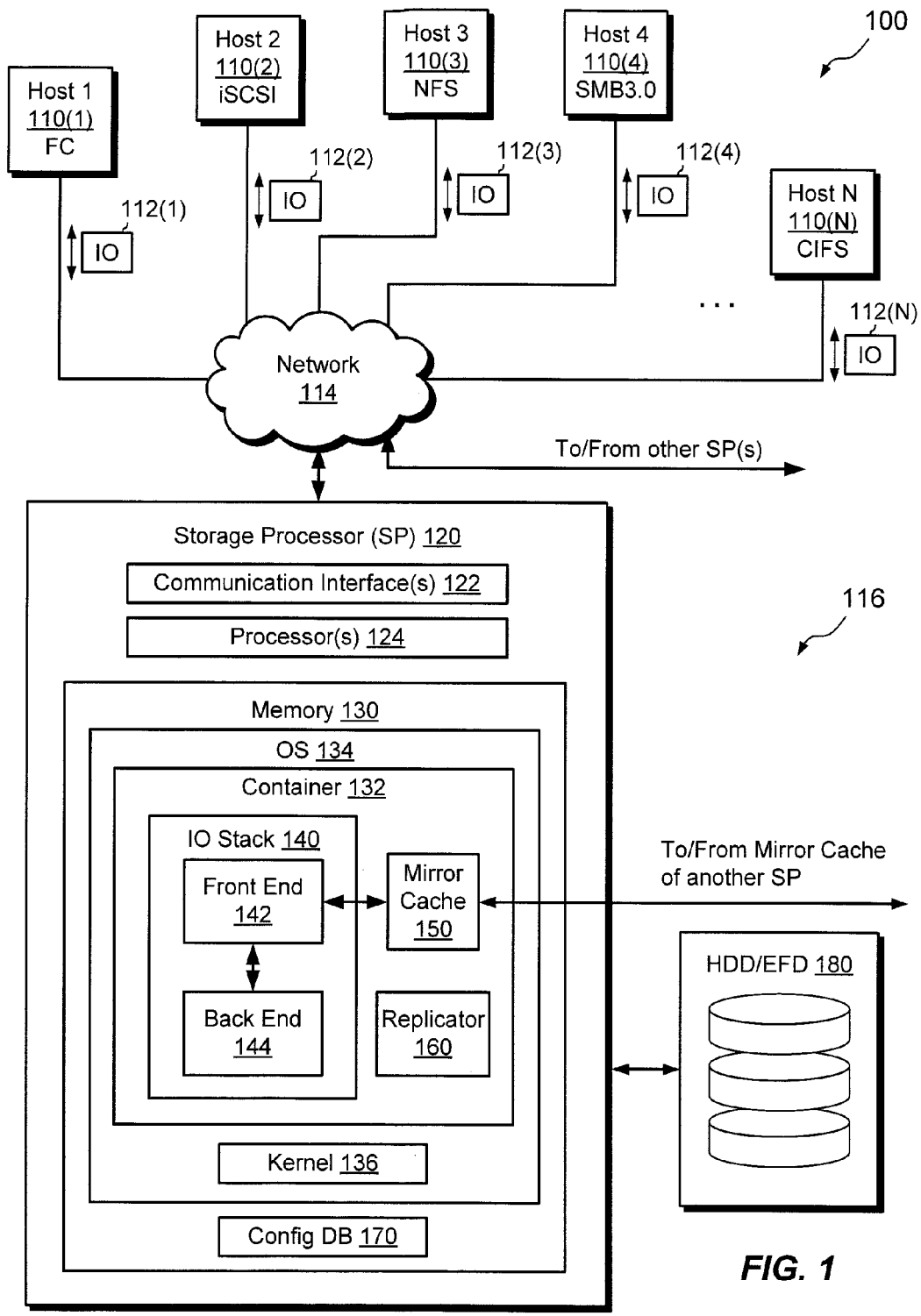
FIG. 1 is a block diagram showing an example storage processor of a data storage apparatus in an example environment wherein improved techniques hereof may be practiced.

FIG. 1 shows an example environment 100 in which embodiments of the improved technique hereof can be practiced. Here, multiple host computing devices ("hosts"), shown as devices 110(1) through 110(N), access a data storage apparatus 116 over a network 114. The data storage apparatus 116 includes a storage processor, or "SP," 120 and storage 180. The storage 180 is provided, for example, in the form of hard disk drives and/or electronic flash drives. Although not shown in FIG. 1, the data storage apparatus 116 may include multiple SPs like the SP 120. For instance, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs (including a single one) can be provided and the SP 120 can be any type of computing device capable of processing host IOs.

The network 114 can be any type of network or combination of networks, such as a storage area network (SAN), local area network (LAN), wide area network (WAN), the Internet, and/or some other type of network, for example. In an example, the hosts 110(1-N) connect to the SP 120 using various technologies. For example, the host 110(1) can connect to the SP 120 using Fibre Channel (e.g., through a SAN). The hosts 110(2-N) can connect to the SP 120 using TCP/IP, to support, for example, iSCSI, NFS, SMB 3.0, and CIFS. Any number of hosts 110(1-N) may be provided, using any of the above protocols, some subset thereof, or other protocols besides those shown. As is known, Fibre Channel and iSCSI are block-based protocols, whereas NFS, SMB 3.0, and CIFS are file-based protocols. The SP 120 is configured to receive IO requests 112(1-N) according to both block-based and file-based protocols and to respond to such IO requests 112(1-N) by reading or writing the storage 180.

The SP 120 is seen to include one or more communication interfaces 122, a set of processors 124, and memory 130. The communication interfaces 122 include, for example, adapters, such as SCSI target adapters and network interface adapters, for converting electronic and/or optical signals received from the network 114 to electronic form for use by the SP 120. The set of processors 124 includes one or more processing chips and/or assemblies. In a particular example, the set of processors 124 includes numerous multi-core CPUs. The memory 130 includes both volatile memory (e.g., RAM), and non-volatile memory, such as one or more ROMs, disk drives, solid state drives (SSDs), and the like. The set of processors 124 and the memory 130 together form control circuitry, which is constructed and arranged to carry out various methods and functions as described herein. Also, the memory 130 includes a variety of software constructs realized in the form of executable instructions. When the executable instructions are run by the set of processors 124, the set of processors 124 are caused to carry out the operations of the software constructs. Although certain software constructs are specifically shown and described, it is understood that the memory 130 typically includes many other software constructs, which are not shown, such as various applications, processes, and daemons.

As shown, the memory 130 includes an operating system 134, such as Unix, Linux, or Windows™, for example. The operating system 134 includes a kernel 136. The memory 130 further includes a container 132. In an example, the container 132 is a software process that provides an isolated userspace execution context within the operating system 134. In various examples, the memory 130 may include multiple containers like the container 132, with each container providing its own isolated userspace instance. Although containers provide isolated environments that do not directly interact (and thus promote fault containment), different containers can run on the same kernel 136 and can communicate with one another using inter-process communication (IPC) mediated by the kernel 136. Containers are well-known features of Unix, Linux, and other operating systems.

In the example of FIG. 1, only a single container 132 is shown. Running within the container 132 is an IO stack 140, a mirror cache 150, and a replicator 160. The IO stack 140 provides an execution path for host IOs (e.g., 112(1-N)) and includes a front end 142 and a back end 144. The mirror cache 150 stores data for incoming writes and mirrors the data to cache on another SP. The replicator 160 makes local and/or remote copies of data for incoming writes. As the IO stack 140, mirror cache 150, and replicator 160 all run within the same container 132, the IO stack 140, mirror cache 150, and replicator 160 can communicate with one another using APIs (application program interfaces), i.e., without the need to use IPC.

The memory 130 also stores a configuration database 170. The configuration database 170 stores system configuration information. In other implementations, the configuration database 170 is stored elsewhere in the data storage apparatus 116, such as on a disk drive separate from the SP 120 but accessible to the SP 120, e.g., over a backplane or network.

In operation, the hosts 110(1-N) issue IO requests 112(1-N) to the data storage apparatus 116. The IO requests 112(1-N) may include both block-based requests and file-based requests. The SP 120 receives the IO requests 112(1-N) at the communication interfaces 122 and passes the IO requests to the IO stack 140 for further processing. At the front end 142, processing may include caching data provided with any write IO requests to the mirror cache 150, which may in turn cache the data to another SP. Also within the front end 142, mapping operations map LUNs and host file systems to underlying files stored in a set of internal file systems of the front end 142. Host IO requests received for reading and writing both LUNs and file systems are thus converted to reads and writes of respective files. The IO requests then propagate to the back end 144, where commands are executed for reading and/or writing the physical storage 180, agnostically to whether the data read and/or written is directed to a LUN or to a host file system.

Although FIG. 1 shows the front end 142 and the back end 144 together in an "integrated" form, the front end 142 and back end 144 may alternatively be provided on separate SPs. For example, the IO stack 140 may be implemented in a "modular" arrangement, with the front end 142 on one SP and the back end 144 on another SP. The IO stack 140 may further be implemented in a "gateway" arrangement, with multiple SPs running respective front ends 142 and with a back end provided within a separate storage array. The back end 144 performs processing that is similar to processing natively included in many block-based storage arrays. Multiple front ends 142 can thus connect to such arrays without the need for providing separate back ends.

Figure 2:
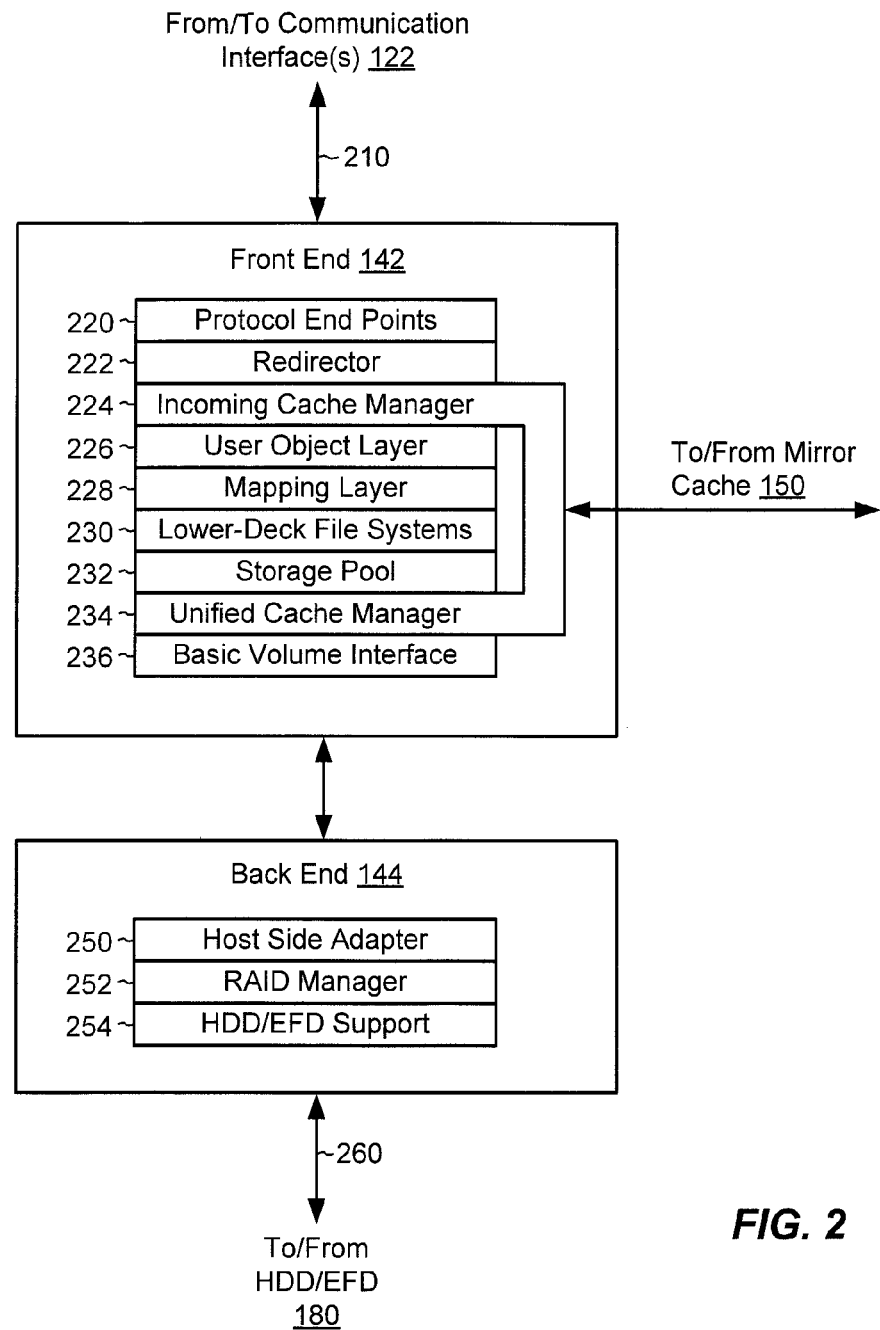
FIG. 2 is a block diagram showing particular example features of the storage processor of FIG. 1, including features of a front end and a back end of an IO stack.

FIG. 2 shows the front end 142 and back end 144 of the IO stack 140 in additional detail. Here, the front end 142 is seen to include protocol end points 220, a redirector 222, an incoming cache manager 224, a user object layer 226, a mapping layer 228, one or more lower-deck (internal) file systems 230, a storage pool 232, a unified cache manager 234, and a basic volume interface 236. The back end 144 is seen to include a host side adapter 250, a RAID (Redundant Array of Independent Disks) manager 252, and hard disk drive/electronic flash drive support 254.

Within the front end 142, protocol end points 220 receive the host IO requests 210 from the communication interfaces 122 and perform protocol-specific processing, such as stripping off header information and identifying data payloads. Processing then continues to the redirector 222.

The redirector 222 receives the host IOs and, under specified conditions, redirects the host IO requests to another SP. For example, the LUN specified in any block-based host IO request may be owned by a particular SP of the data storage apparatus 116. If the SP 120 receives a host IO request that is directed to a LUN owned by another SP, the redirector 222 sends the host IO to the SP that owns the LUN, at which point processing of the host IO request by the SP 120 ceases. However, if the redirector 222 detects that the LUN specified in a block-based host IO request is owned by the SP 120, the redirector allows the host IO request to continue to propagate through the front end 142. The redirector 222 performs no operation for file-based host IO requests. For host IO requests that are not redirected, processing continues to the incoming cache manager 224.

The incoming cache manager 224 provides low-latency responses to incoming host IO write requests. When a write IO request is received, the incoming cache manager 224 caches the data specified by the write request in the mirror cache 150. Operating in conjunction with the unified system cache 234, the incoming cache manager 224 directs the contents of the mirror cache 150 to be copied over a high-speed interconnect (e.g., a high-speed cable or bus) to a cache of a second SP of the data storage apparatus, where a duplicate copy of the data is stored. The data specified by the host write IO request are thus stored in two independent locations and are deemed to be persisted. Upon confirmation that the data have been successfully written to both the mirror cache 150 and the cache of the other SP, the incoming cache manager 224 acknowledges the write back to the originating host (i.e., the host of 110(1-N) that sent the write host IO). Using this arrangement, write requests are acknowledged quickly, without the need to wait until the requests propagate to the actual storage 180 or even to the unified cache manager 234, thereby providing a low level of latency in responding to write IOs. The data stored in the mirror cache 150 may eventually be destaged to the storage 180 (e.g., to the set of slices that store the LUN or file system being written to), but such destaging may be conducted when convenient and out of band with the processing of host IOs. Processing continues to the incoming user object layer 226.

The user object layer 226 presents underlying files representing LUNs and underlying files representing host file systems in a form recognized by the hosts (i.e., as LUNs and host file systems). For example, the user object layer 226 presents data stored in underlying files for block-based data as LUNs. The user object layer 226 also presents data stored in underlying files for file-based data as host file systems. In an example, the user object layer 226 includes an upper-deck file system for each host file system stored in a file of the lower-deck file system(s) 230 (described below). Each upper-deck file system presents files and directories of a host file system to the hosts 110(1-N), even though the host file system is represented internally as a file.

The mapping layer 228 maps host objects as presented in the user object layer 226 to corresponding underlying files stored in one or more lower-deck file systems 230. For LUNs, the mapping layer 228 converts a LUN identifier and offset range to a particular file in a lower-deck file system 230 and to a particular offset range within that file. Any set of blocks of a LUN identified in a host IO request are thus mapped to a set of blocks in the underlying file that represents the LUN. Similarly, for host file systems, the mapping layer 228 converts a given file or directory represented in an upper-deck file system of the user object layer 226 to a particular file in a lower-deck file system 230 and to a particular location within the file.

The lower-deck file system layer 230 represents LUNs and host file systems in the form of files. Any number of lower-deck file systems 230 may be provided. In one arrangement, a single lower-deck file system 230 may be provided to include any number of LUNs and/or host file systems, as well as their snaps (i.e., point-in-time copies). In another arrangement, a different lower-deck file system is provided for each primary object to be stored, i.e., for each LUN and for each host file system. The lower-deck file system for any primary object may include a file storing the object itself, as well as files storing any snaps of the object. Each lower-deck file system 230 has an inode table, which provides a unique inode for each file stored in the lower-deck file system 230. The inode table of each lower-deck file system stores properties of each file in the respective lower-deck file system, such as ownership and block locations at which the file's data are stored. Lower-deck file systems are built upon storage elements managed by a storage pool 232.

The storage pool 232 organizes elements of the storage 180 in the form of slices. A "slice" is an increment of storage space, such as 256 MB in size, which is drawn from the storage 180. The pool 232 may allocate slices to lower-deck file systems 230 for use in storing their files. The pool 232 may also deallocate slices from lower-deck file systems 230 if the storage provided by the slices is no longer required. In an example, the storage pool 232 creates slices by accessing RAID groups formed from the storage 180, dividing the RAID groups into FLUs (Flare LUNs), and further dividing the FLU's into slices.

The unified cache manager 234 provides caching services for data stored in the lower-deck file systems 230. In some examples, the unified cache manager 234 directs data specified by host writes to local RAM or flash memory and thus avoids the need to access the storage 180, which is typically more remote than the local RAM or flash memory and takes more time to access. In some examples, the unified cache manager 234 also directs data returned in response to read IO requests to be stored in local RAM or flash memory for fast access in the event that subsequent host IO requests require the same data. In some examples, the local RAM or flash memory may store the only valid copy of host data, with writes to the storage 180 being deferred and, in cases where host data needs to be stored only transiently, avoided altogether.

The basic volume interface 236 is arranged to send host IOs to the back end 144 when the back end 144 is provided on another SP of the data storage apparatus 116 or when the back end 144 is provided on a separate array. In an example, the basic volume interface 236 converts host IOs propagating out of the front end 142 to a block-based protocol, such as Fibre Channel. After being processed by the basic volume interface 236, processing continues to the back end 144.

Within the back end 144, the host side adapter 250 receives the host IO and extracts the host IO content. In some implementations, such as the "integrated" arrangement shown in FIG. 1, the basic volume interface 236 and host side adapter 250 may be omitted or may be made to perform no operation.

The RAID manager 252 accesses the particular slice or slices being written or read using RAID protocols. In some examples, the RAID manager 252 also performs out-of-band operations of maintaining RAID groups, such as swapping out failing disk elements and applying erasure coding to restore required redundancy.

The hard disk drive/electronic flash drive support 254 includes drivers that perform the actual reading from or writing to the storage 180.

Although the above-described components of the IO stack 140 are presented in a particular order, this order can be varied. For example, the incoming cache manager 224 can be located above the redirector 222. Also, multiple cache managers can be provided at different locations within the IO stack 140.

Figure 3:
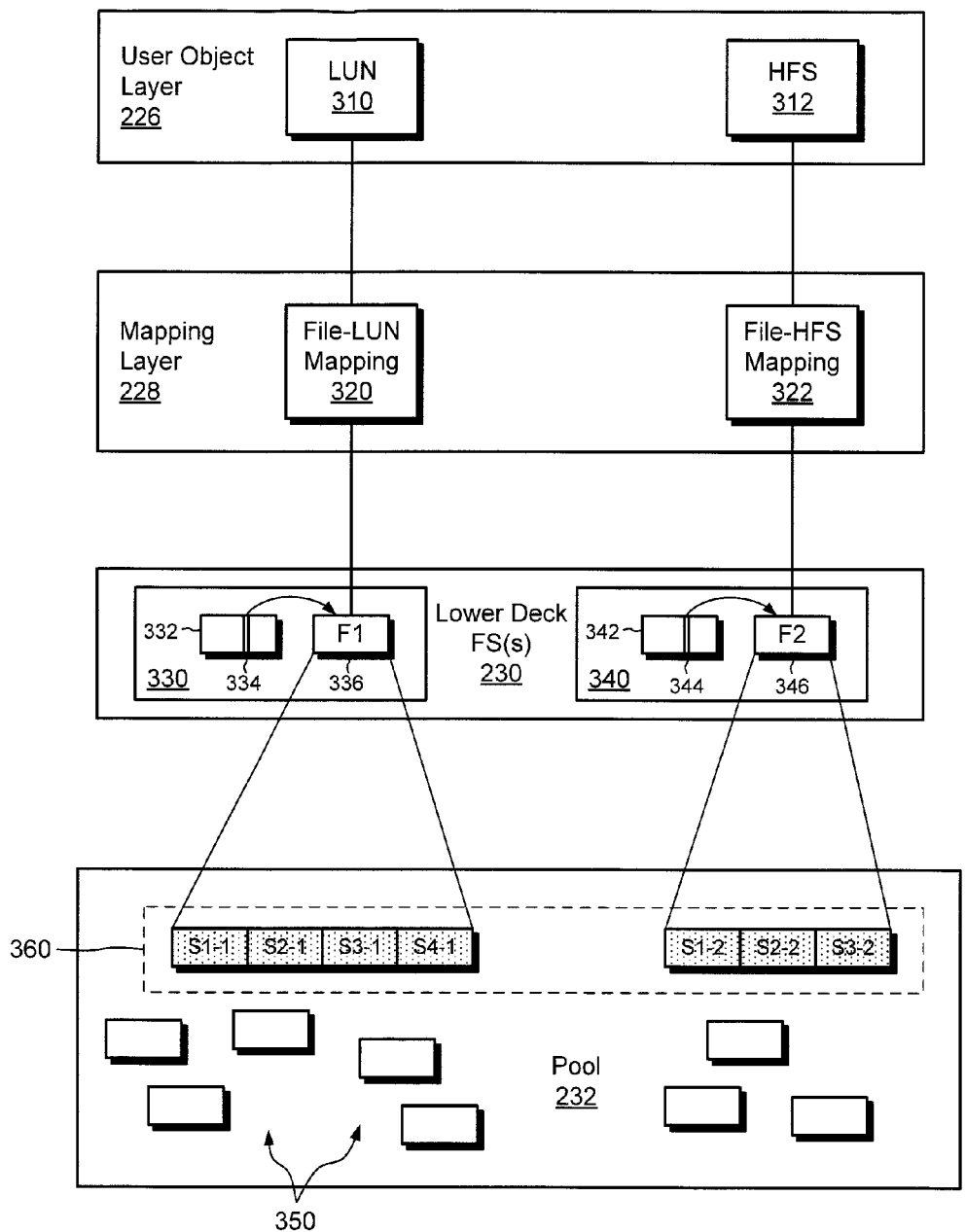
FIG. 3 is a block diagram showing example features of the front end of FIG. 2 in additional detail, including lower-deck file systems built upon storage units (e.g., slices) from a storage pool.

FIG. 3 shows portions of the front end 142 in additional detail. Here, the user object layer 226 includes a representation of a LUN 310 and of an HFS (host file system) 312, and the mapping layer 228 includes a file-to-LUN mapping 320 and a file-to-HFS mapping 322. The file-to-LUN mapping 320 maps the LUN 310 to a first file F1 (336), and the file-to-HFS mapping 322 maps the HFS 312 to a second file F2 (346). Through the file-to-LUN mapping 320, any set of blocks identified in the LUN 310 by a host IO is mapped to a corresponding set of blocks within the first file 336. Similarly, through the file-to-HFS mapping 322, any file or directory of the HFS 312 is mapped to a corresponding set of blocks within the second file 346.

The first file 336 and the second file 346 are included within the lower-deck file systems 230. In this example, a first lower-deck file system 330 includes the first file 336 and a second lower-deck file system 340 includes the second file 346. Each of the lower-deck file systems 330 and 340 includes an inode table, 332 and 342, respectively. The inode tables 332 and 342 provide information about files in respective lower-deck file systems in the form of inodes. For example, the inode table 332 of the first lower-deck file system 330 includes an inode 334, which provides file-specific information about the first file 336. Similarly, the inode table 342 of the second lower-deck file system 340 includes an inode 344, which provides file-specific information about the second file 346. The information stored in each inode includes location information (e.g., block locations) where the respective file is stored, and may thus be accessed as metadata to identify the locations of the files 336 and 346.

Although a single file is shown for each of the lower-deck file systems 330 and 340, it is understood that each of the lower-deck file systems 330 and 340 may include any number of files, each with its own entry in the respective inode table. In one example, each lower-deck file system stores not only the file F1 or F2 for the LUN 310 or HFS 312, but also snaps of those objects. For instance, the first lower-deck file system 330 stores the first file 336 along with a different file for every snap of the LUN 310. Similarly, the second lower-deck file system 340 stores the second file 346 along with a different file for every snap of the HFS 312.

As shown, a set of slices 360 is allocated by the storage pool 232 for storing the first file 336 and the second file 346. In the example show, slices S1-1 through S4-1 are used for storing the first file 336, and slices S1-2 through S3-2 are used for storing the second file 346. The data that make up the LUN 310 are thus stored in the slices S1-1 through S4-1, whereas the data that make up the HFS 312 are stored in the slices S1-2 through S3-2. In an example, the storage pool 232 allocates slices 350 to the set of file systems 230 in an on-demand manner, e.g., as the first file 236 and the second file 246 require additional storage. The storage pool 232 can also deallocate slices from the set of file systems 230 when all the currently allocated slices are no longer required.

In some examples, each of the lower-deck file systems 330 and 340 is associated with a respective volume, such as a sparse LUN. Sparse LUNs provide an additional layer of mapping between the lower-deck file systems 230 and the pool 232 and allow the lower-deck file systems to operate as file systems normally do, by accessing underlying volumes. Additional details about sparse LUNs and their relation to lower-deck file systems may be found in U.S. Pat. No. 7,631,155, which is hereby incorporated by reference in its entirety. The incorporated patent uses the term "container file systems" to refer to constructs similar to the lower-deck file systems disclosed herein.

Figure 4A:
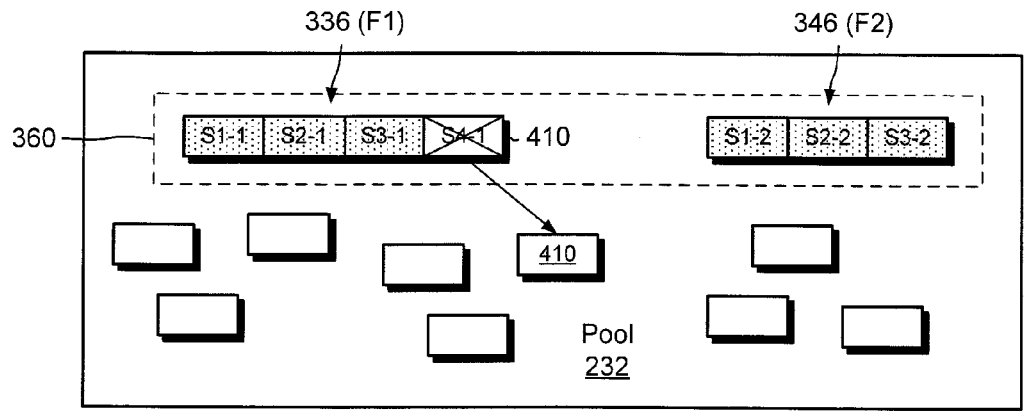
FIGS. 4A-4C are a series of block diagrams showing an example way in which a slice used to store a first file representing a LUN is reallocated for use by a second file representing a host file system.
Figure 4B:
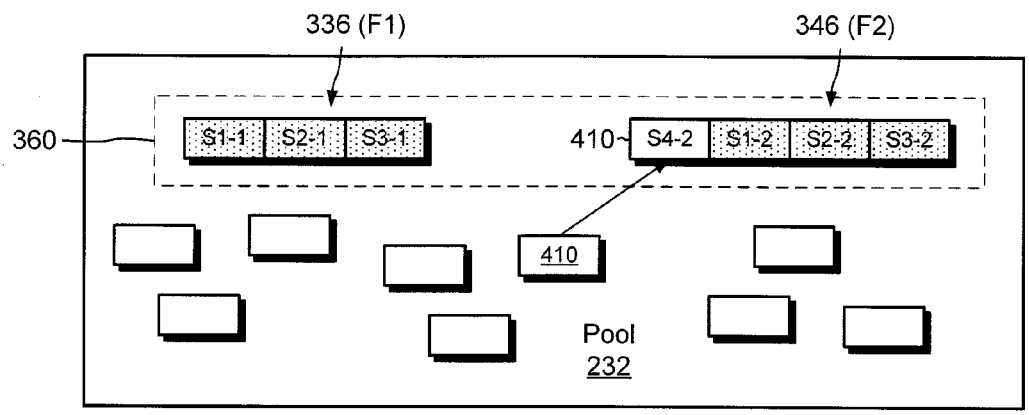
Figure 4C:
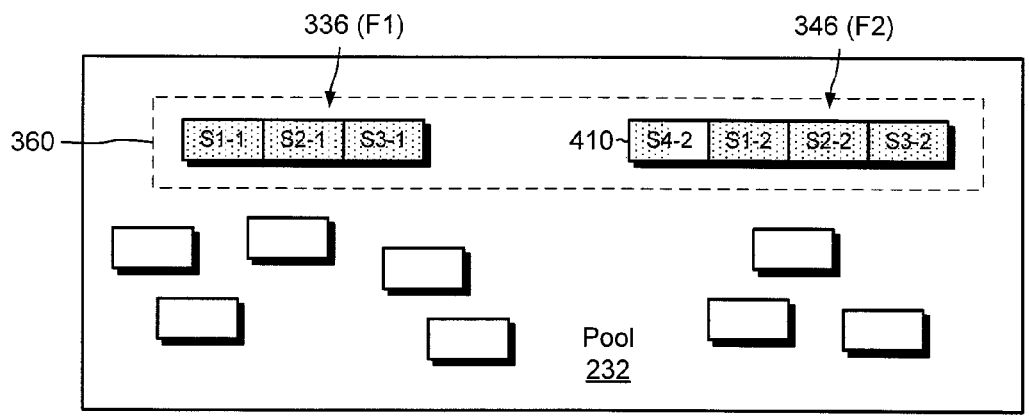

FIGS. 4A-4C show a sequence of events for reusing a slice 410 that once stored portions of the first file 336 for storing portions of the second file 346 when the slice 410 is no longer required by the first file 336. In FIG. 4A, it is shown that slice S4-1 (also labeled 410), which previously stored data for the first file 336, has become empty. This may occur, for example, when data is deleted from the LUN 310. In response to the slice S4-1 (410) becoming empty, the storage pool 232 deallocates the slice 410 from the set of file systems 230 and makes the slice 410 available.

In FIG. 4B, the free slice 410 is reallocated to the set of file systems 230 for use by the second file 346. Thus, the slice 410 becomes a newly added slice S4-2. In an example, the pool 232 reallocates the slice 410 to the set of file systems in response to the second file 346 requiring additional storage. This may occur, for example, in response to the HFS 312 growing to accommodate additional, or larger, files.

In FIG. 4C, with the first file 346 still storing data for the LUN 310, the slice 410 has become part of the second file 346 (as slice S4-2) and additional data for the second file 346 are stored on the newly acquired slice.

In the manner shown, a slice first used by the LUN 310 is reused by the HFS 312. Thus, storage space originally used for storing block-based data is reused for storing file-based data. Although FIGS. 4A-4C show block-based storage being reused for file-based storage, it is evident that file-based storage can also be reused for block-based storage. For example, the slice 410 can be released from the second file 346 and reused by the first file 336. Thus, inefficiencies of stranded storage are significantly reduced or eliminated.

Figure 5:
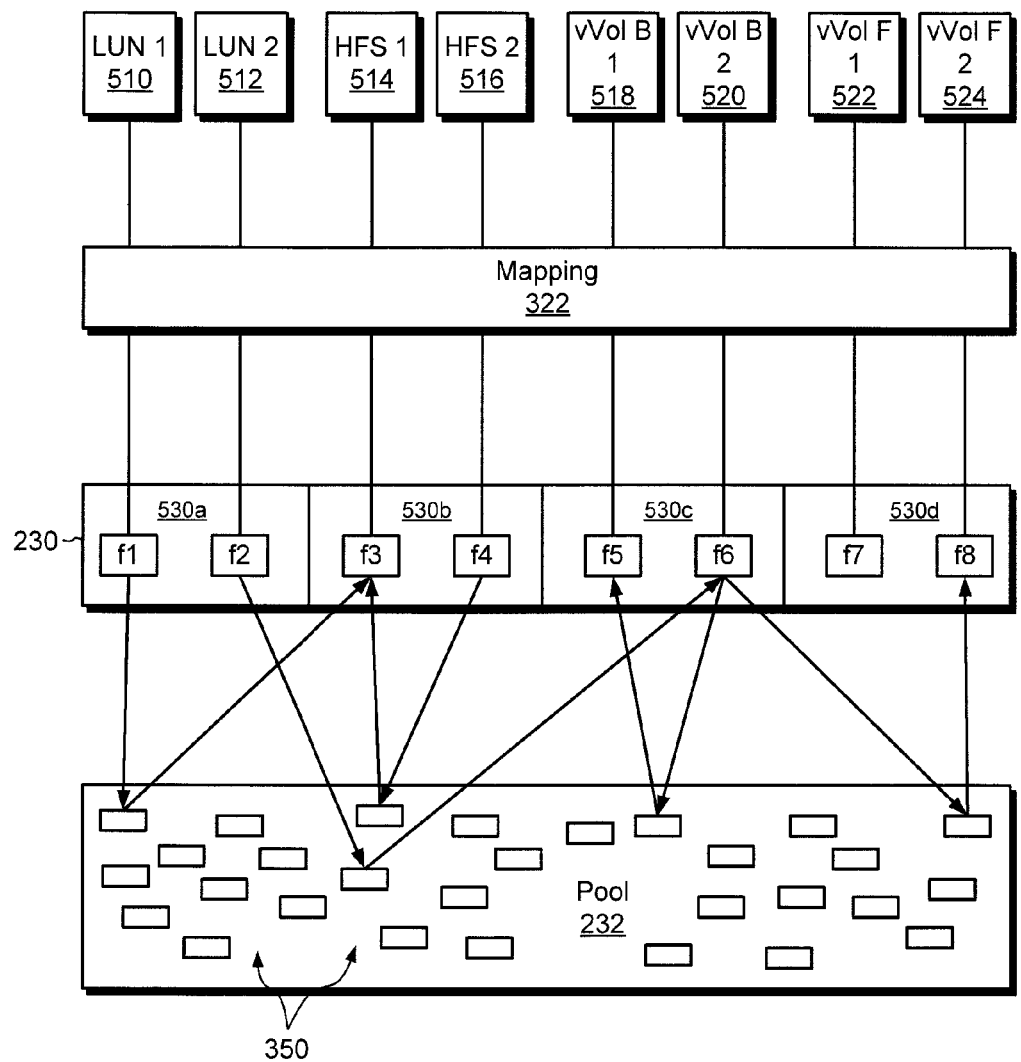
FIG. 5 is a block diagram showing an example manner in which storage slices from the storage pool can be reused by different files of the lower-deck file systems.

FIG. 5 shows a flexible manner in which files of lower-deck file systems can store a variety of host objects and how slices can be readily reused across different files. Here, files f1 and f2 within a lower-deck file system 530a store file representations of LUNs 510 and 512. Also, files f3 and f4 within a lower-deck file system 530b store file representations of host file systems 514 and 516. Additional host objects are stored, including block-based vVols 518 and 520 in files f5 and f6 (in a lower-deck file system 530c), and file-based vVols 522 and 524 in files f7 and f8 (in a lower-deck file system 530d). As is known, vVols are virtual storage volumes that are associated with particular virtual machines. In an example, any of the hosts 110(1-N) may run a virtual machine, which references a vVol stored on the data storage apparatus 116.

As illustrated with the arrows extending between the files f1 through f8 and slices 350 in the pool 232, slices used for any of the files f1 through f8 can be deallocated when they are no longer needed and reallocated for use with other files as those files require additional storage. As all host objects (e.g., LUNs, host file systems, block-based vVols, or file-based vVols) are represented as files, slices may be readily exchanged among them. Stranded storage is thus avoided for all of these host object types.

Figure 6A:
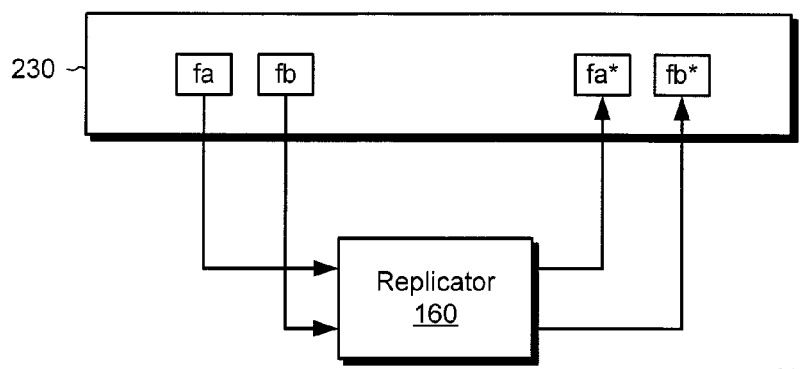
FIGS. 6A and 6B show different example replication operations on files of a lower-deck file system.
Figure 6B:
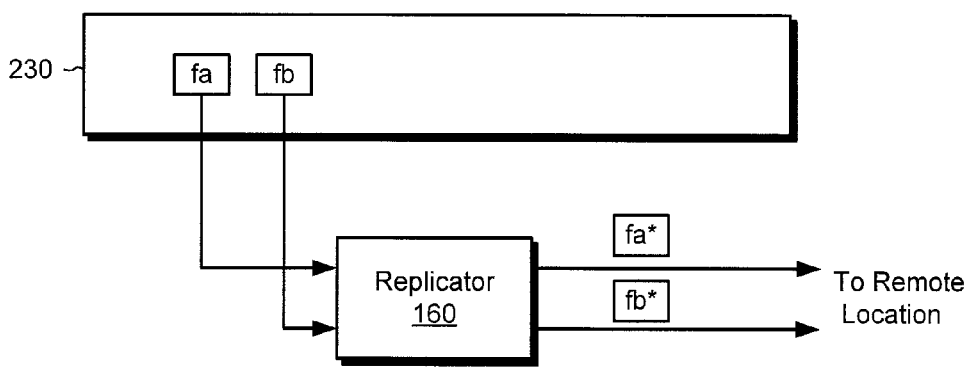

FIGS. 6A and 6B show different uses of the replicator 160. The replicator 160 performs data protection operations on host objects by copying and/or snapping their underlying files to local and/or remote locations.

In FIG. 6A, the replicator 160 copies or snaps a file "fa," which represents a LUN in the set of file systems 230 to produce another file "fa*" in the set of file systems 230. The file "fa*" may be a copy or a snap of the file "fa." The replicator 160 also copies or snaps a file "fb," which represents a host file system in the set of file systems 230 to produce another file "fb*" in the set of file systems 230. As shown, the same replicator 160 performs similar functions (file copies) in both situations, for providing data protection for both a LUN and a host file system.

In FIG. 6B, the replicator 160 performs similar copy and/or snap operations on the files "fa" and "fb," but in this case provides copies or snaps "fa*" and "fb*" to a remote location, i.e., a location remote from the data storage apparatus 116. The remote copies and/or snaps thus provide data protection for the LUN represented by "fa" and for the host file system represented by "fb" even in the event of a natural disaster in the vicinity of the data storage apparatus 116.

In some examples, the replicator 160 can operate in both a "sync" mode and an "async" mode. In sync mode, the replicator 160 performs a remote replication "in sync" with receiving write IO requests. For example, in response to a host IO request specifying data to be written, the replicator 160 attempts to write the host data to a remote storage point (e.g., to a RecoverPoint Appliance) and only acknowledges the write back to the originating host after both the write to the remote storage point and the local write have been acknowledged. In async mode, by contrast, a host IO request specifying a write is acknowledged back to the originating host as soon as the host data are successfully received (e.g., as soon as they are stored in the mirror cache 150 and mirrored to another SP). A local or remote copy is then made of the host object (LUN, host file system, etc.) asynchronously, i.e., out of band, with incoming write IO requests.

Although not specifically shown, other functions besides replication are also greatly simplified by representing LUNs, file systems, and other host objects in the form of files. For example, functions such as snapping, de-duplication, migration, failover, and non-disruptive upgrade are similarly benefited by the ability to commonly treat host objects as files.

In addition to the operations described above, the SP 210 can also perform advanced data services. For example, the configuration database 170 (FIG. 1) may store records defining one or more virtualized storage processors. A "virtualized storage processor" is a collection of definitions, file systems, settings, and interfaces, which can be instantiated on an SP (i.e., on a physical SP) to realize an entity that acts like its own SP. Multiple virtualized storage processors can be instantiated on a physical SP (e.g., the SP 210) to effectively multiply the number of storage processors of the data storage apparatus 116.

Figure 7:
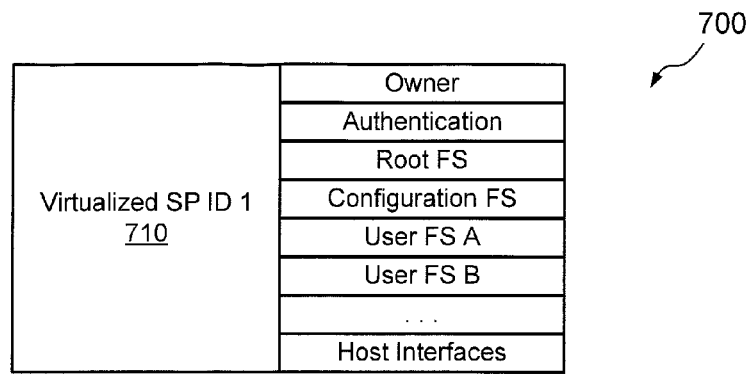
FIG. 7 is a table showing an example set of records stored in a configuration database that defines a virtualized storage processor that can be run on the storage processor of FIG. 1.

FIG. 7 shows an example set of records 700 in the configuration database 170 that define a virtualized storage processor 710. The records specify, for example, an owning SP, authentication, and file system identifiers for the virtualized storage processor 710, including identifiers of a root file system, a configuration file system, and various user file systems that may be accessed using the virtualized storage processor 710. The records may further specify various host interfaces that define host IO protocols that the virtualized storage processor 710 is equipped to handle.

The set of records 700 thus identifies not only user file systems, but also a set of interfaces and settings that form a "personality." This personality enables the virtualized storage processor 710 to interact with hosts in a manner similar to the way a physical storage processor interacts with hosts.

Although the set of records 700 is shown to define only a single virtualized storage processor 710, it is understood that the configuration database 170 may store any number of virtualized storage processor definitions for instantiating any number of virtualized storage processors on the data storage apparatus 116. The virtualized storage processors are instantiated with their respective host interfaces, and can each respond to host IO requests for reading and writing data of their respective file systems, which data are stored in the storage 180.

It is understood that virtualized storage processors operate in connection with the front end 142 of the IO stack 140. The virtualized storage processors thus remain with their respective front ends 142 in modular and gateway arrangements. The file systems that belong to a virtualized storage processor are stored as files in the lower-deck file systems 230, in the manner described above for host file systems. Indeed, in some arrangements, all host file systems implemented in the data storage apparatus 116 belong to one or more virtualized storage processors and are accessed through the virtualized storage processor(s). In some examples, multiple virtualized storage processors share the same front end IO stack 142. In other examples, each virtualized storage processor includes its own separate instance of the front end IO stack 142.

In an example, virtualized storage processors are instantiated within containers (e.g., container 132). For example, a single container may host any number of virtualized storage processors.

Figure 8A:
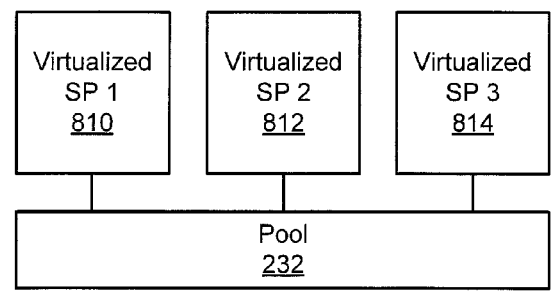
FIGS. 8A and 8B are block diagrams showing example arrangements of virtualized storage processors.
Figure 8B:
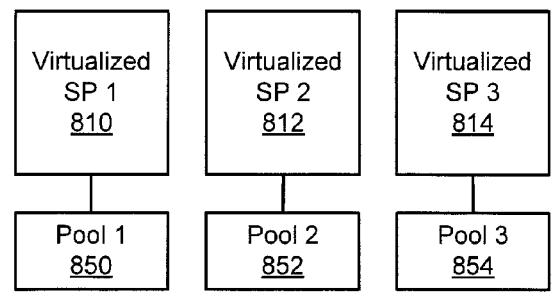

FIGS. 8A and 8B show two different example arrangements of virtualized storage processors. In both cases, the virtualized storage processors run within the container 132 of the memory 130.

In FIG. 8A, multiple virtualized storage processors 810, 812, and 814 access the storage pool 232. Thus, the lower-deck file systems of the virtualized storage processors 810, 812, and 814 all derive the slices needed to store their underlying files from the pool 232.

In FIG. 8B, multiple storage pools 850, 852, and 854 are provided, one for each of the virtualized storage processors 810, 812, and 814, respectively. Providing different pools for respective virtualized storage processors promotes data isolation among the virtualized storage processors, and thus may be better suited for applications involving multiple tenants which require that each tenant's data be kept separate from the data of other tenants.

Figure 9:
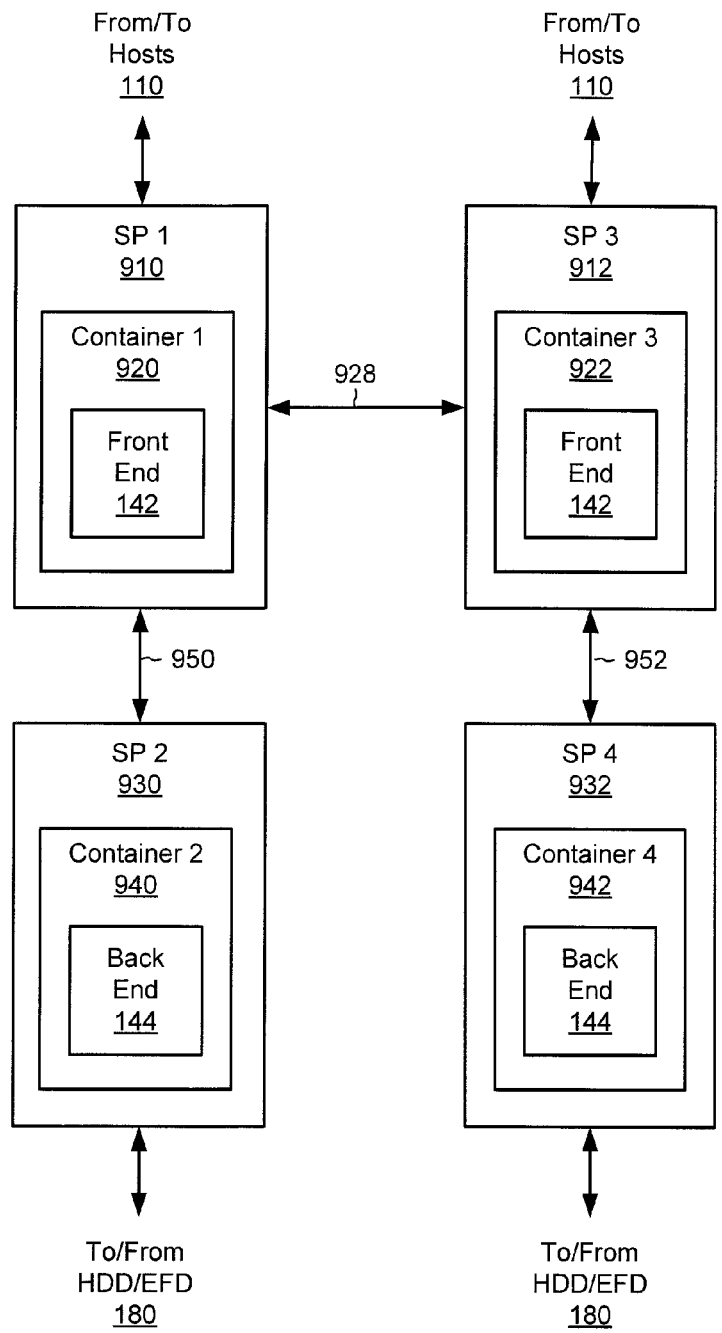
FIG. 9 is a block diagram showing an example arrangement involving three storage processors in a modular arrangement, where two storage processors are configured to run front ends and one storage processor is configured to run a back end.
Figure 10:
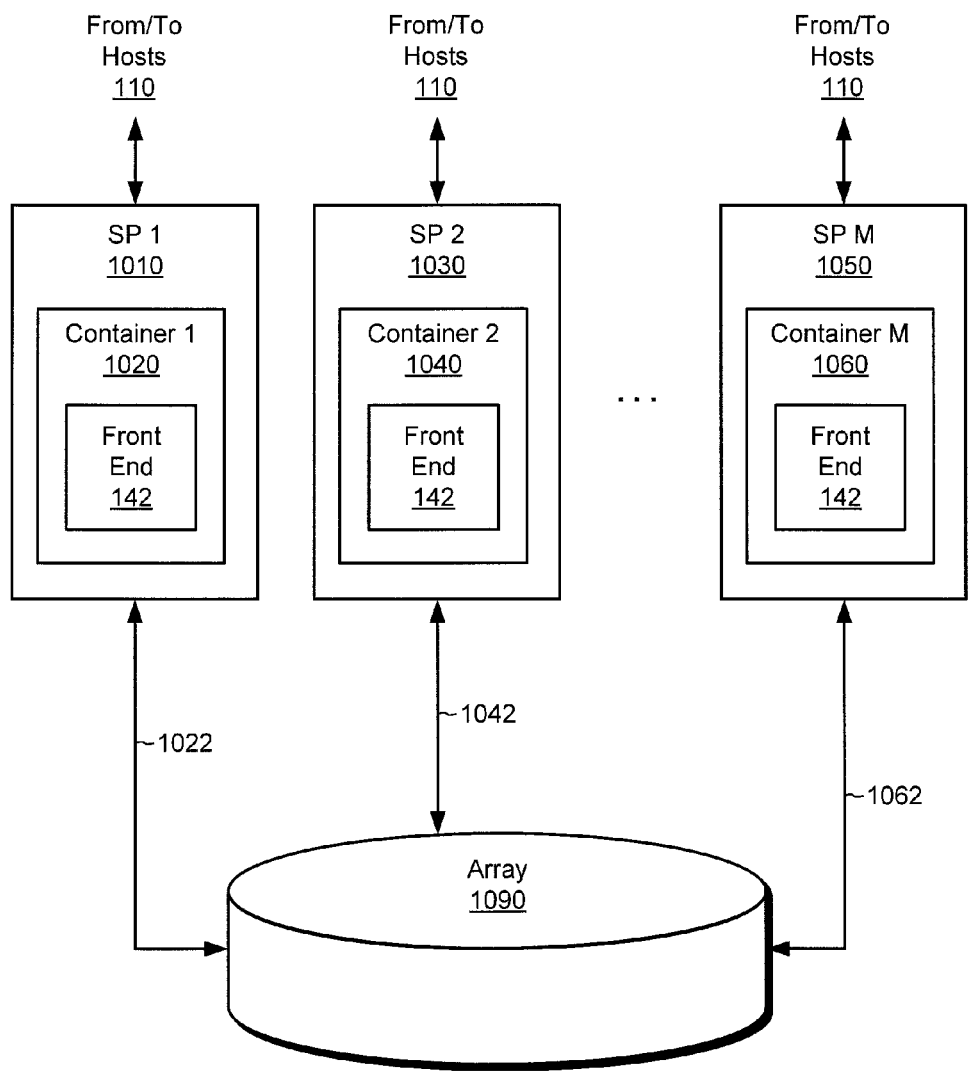
FIG. 10 is a block diagram that shows an example arrangement in which multiple storage processors run respective front ends and are connected in a gateway configuration to a data storage array.

FIGS. 9 and 10 show different deployments of the IO stack 140. In FIG. 9, a modular deployment is shown in which a first SP 910 houses a front end 142 in a first container 920 and a second SP 930 houses the back end 144 in a second container 940. An interconnection 950 is formed between the first SP 910 and the second SP 930. In an example, the interconnection 950 is made using Fibre Channel or some other block-based protocol. To support cache mirroring (via connection 928), as well as other functions, a parallel arrangement may be formed with a third SP 912 housing a front end 142 in a third container 922 and a fourth SP 932 housing a back end 144 in a fourth container 942. An interconnection 952 is formed between the third SP 912 and the fourth SP 932. With this arrangement, performance gains can be realized over the integrated configuration of FIG. 1, because the modular configuration dedicates the computing and memory resources of multiple SPs to handling host IOs, and because each SP is optimized for operating as a front end or as a back end but is not required to operate as both. Also, although the first SP 910, the second SP 930, the third SP 912, and fourth SP 932 are physical SPs, any of the SPs housing front ends 142 (SP1 and SP3) can themselves house any number of virtualized storage processors.

FIG. 10 shows a gateway arrangement, in which multiple SPs 1010, 1030, . . . , 1050 each house a front end 142 in respective containers 1020, 1040, . . . , 1060. Interconnections 1022, 1042, . . . , 1062 (such as Fibre Channel) respectively connect the SPs 1010, 1030, . . . , 1050 to an array 1090. The array 1090 includes its own internal back end, for responding to block-based IOs. Although three SPs are shown providing front ends 142, it is understood that a greater or lesser number of SPs providing front ends 142 may be provided. Also, cache mirroring and other functions may be best supported by providing SPs in pairs. The number of SPs in the gateway arrangement is preferably even. Suitable examples of the array 1090 include the VMAX® and VPLEX® storage arrays available from EMC Corporation of Hopkinton, Mass.

File Metro Cluster Failover:

Particular aspects of file metro cluster failover will now be discussed, wherein distributed data managers are provided within the IO stacks of SPs within a metro cluster to enable fast and efficient failover between different geographical sites.

Figure 11:
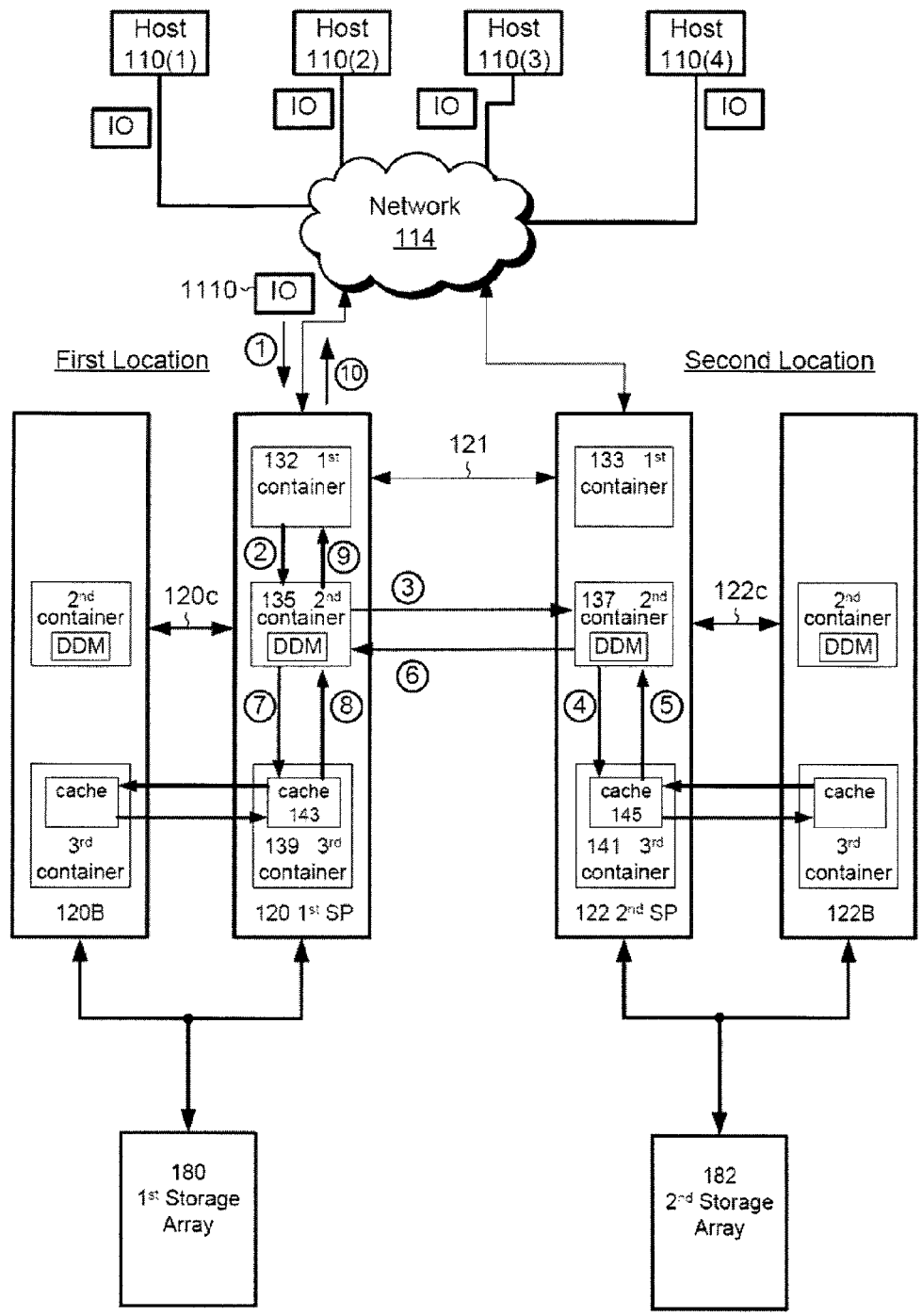
FIG. 11 is a block diagram of an example arrangement of multiple storage processors operating to perform distributed storage of host data.

FIG. 11 is a block diagram of an example arrangement of multiple storage processors for performing fast and efficient failover between sites. Here, a first storage processor (SP) 120 (i.e., the same SP as in FIG. 1) is shown coupled to a first storage array 180 (i.e., the same as in FIG. 1) at a first location (also referred to as a site). The SP 120 has a companion SP 120B, which is also coupled to the first storage array 180. The SP 120B may be provided alongside the SP 120 in a single cabinet of the data storage apparatus 116 and connected to the SP 120 via an interconnect 120c, such as a PCI Express cable, for example.

The SP 120 is seen to include a first container 132 (i.e., the same as in FIG. 1), a second container 135, and a third container 139. Each container provides an isolated userspace instance. Operating within the first container 132 is a first IO stack layer, e.g. a front end similar to the front end 142 shown in FIGS. 1 and 2. Operating within the second container 135 is a second IO stack layer, which is not shown in the earlier figures but which includes a distributed data manager (DDM). Operating within the third container 139 is a third IO stack layer, e.g., a back end similar to the back end 144 shown in FIGS. 1 and 2. Unlike the back-end 144, the third IO stack layer running in the $3^{rd}$ container 139 includes a cache 143. The arrangement of the SP 120 as shown in FIG. 11 may be regarded as an integrated deployment.

At the second location, a second SP 122 is shown coupled to a second storage array 182. The SP 122 has a companion SP 122B, which is also coupled to the first storage array 182. The SP 122B may be provided alongside the SP 122 in a single cabinet of a data storage apparatus at the second location and connected to the SP 122 via an interconnect 122c, such as a PCI Express cable, for example.

The second SP 122 is configured with first through third containers 133, 137, and 141, respectively, where the container 141 includes a cache 145. The second SP 122 is configured in a similar manner to the SP 120.

Embodiments hereof may operate in an integrated deployment, as described above, with a third IO stack layer operated within the third container 139/141. Embodiments hereof may alternatively operate in a gateway deployment, e.g., similar to that shown in FIG. 10. In gateway deployments, the SPs do not include the third container (e.g., 139, 141), but instead use the DDMs in the second containers to virtualize LUNs, coordinate data mirroring, and manage cache in locally connected arrays to maintain cache coherency.

The first location may be local to or remote from the second location. For example, the first and second locations may be different locations within the same room or building, or they may be geographically separated locations, such as in different buildings, which may be on different streets or different cities. In an example, the data storage apparatus 116 at the first location is connected to the data storage apparatus at the second location via the network 114. The data storage apparatuses may also be connected using a dedicated cable or set of cables, shown as the connection 121 (alternatively, the connection 121 may be considered to be part of the network 114).

In one example, the SPs 120 and 120B are part of a first local cluster of SPs, which may also include additional SPs (not shown) at the first location. The SPs 122 and 122B are part of a second local cluster of SPs, which may also include additional SPs at the second location. The first and second local clusters may together be regarded as forming a wide area cluster, i.e., a metro cluster.

The DDMs of each SP in the metro cluster operate in coordination with one another to perform several functions. These include (i) LUN virtualization, (ii) cache coherency, and (iii) data mirroring.

LUN virtualization is achieved by the DDMs assigning virtual LUN IDs to the LUNs at the first location, the second location, and, generally, at any location within the metro cluster. The first SP 120 and second SP 122 (generally, all SPs in the metro cluster) then access the virtual LUNs by their virtual LUN IDs. In an example, the pool manager 232 running in the front end 142 of the IO stack 140 generates slices from the virtual LUNs and uses the slices to build lower-deck files (e.g., 346; see FIG. 3) for representing host file systems in the lower-deck file systems 230. It is noted that the data stored on virtualized LUNs need not be limited to host data, but may also include configuration and site-specific data about the data processing apparatus 116 at the first location. The configuration data may include the configuration data shown in FIG. 1 as being stored in the configuration database 170. Thus, in an example, any SP in the metro cluster can access the configuration and site-specific data of any other SP in the metro cluster.

Cache coherency is performed by ensuring that the metro cluster maintains a record of any changes to cache on the first SP, such that the state of the cache on the first SP may be duplicated on the second SP in the event of a failure of the first SP.

Data mirroring will now be described in detail. It is understood that, although data mirroring is described below with regard to host data, data mirroring is also performed for configuration and site-specific data about the data processing apparatus 116 at the first location.

An example data mirroring sequence is illustrated with reference to the encircled numbers shown in FIG. 11. At (1), the first SP 120 receives an IO request 1110. In an example, the IO request 1110 specifies data to be written to an identified file at an identified path within an identified file system stored on the first storage array 180. The IO request 1110 is passed to the first container 132 for processing by the first IO stack layer.

At (2), the IO request 1110 (i.e., a processed form thereof) is passed to the second IO stack layer within container 135, where it is processed by the DDM.

At (3), the DDM in the first SP 120 initiates a mirroring operation by directing the IO request 1110 to a DDM running on the second SP 122 at the second location.

At (4), the DDM on the second SP 122 caches the data designated by the IO request 1110 in the cache 145 in the third IO stack layer in the third container 141.

At (5), the cache 145 stores the designated data and sends an acknowledgement to the DDM on the second SP 122 that the designated data have been stored. In some examples, the acknowledgement of (5) is delayed until the second SP 122 locally mirrors the received data to its companion SP 122B, e.g., over the connection 122c.

At (6), the DDM on the second SP 122 sends an acknowledgement to the DDM on the first SP 120 acknowledging that the data designated by the IO request 1110 have been remotely stored.

At (7), the DDM on the first SP 120 directs the cache 143 to store the data designated in the IO request 1110 in the third IO stack layer in the third container 139. At (8), the cache 143 stores the designated data and sends an acknowledgement to the DDM on the first SP 120 that the designated data have been stored. In some examples, the acknowledgement of (8) is delayed until the first SP 120 locally mirrors the received data to its companion SP 120B, e.g., over the connection 120c.

At (9), the DDM on the first SP 120 sends an acknowledgement to the first IO stack layer in the first container 132, confirming that the data designated by the first IO request 1110 has been persisted. Although the caches 143 and 145 may be implemented as a DRAM or other volatile memory, the designated data from the IO request 1110 is deemed persisted when it is stored in volatile memory in two distinct locations. If the SPs 120 and 122 each mirror the data to their companion SPs (120B and 122B), the host data are stored in a total of four locations. With the acknowledgement received at the first IO stack layer in the first container 132, the operating system of the SP 120 receives the prompt acknowledgement that it requires and may proceed with additional processing.

At (10), the first SP 120 sends an acknowledgement to the host that originated the IO request 1110 to confirm that the write has been executed.

In addition to storing the designated data in volatile memory, the SPs 120 and 122 also stores the data in the first storage array 180 and the second storage array 182, respectively. However, storage of the data to the arrays 180 and 182 may happen without particular timing constraints, as the data have already been persisted and the operating system of the SP 120 has received the confirmation it requires to proceed.

Storing data to the arrays 180 and 182 is considerably slower than storing data to the caches 143 and 145, even when accounting for transmission delays between the first SP 120 and the second SP 122. The delays in storing data to the arrays 180 and 182 derive primarily from processing the IO request in many protocol layers and writing the data to a relatively slow (typically magnetic) medium.

With the DDMs of the first and second SPs 120 and 122 operating as described to provide (i) LUN virtualization, (ii) cache coherency, and (iii) data mirroring, the second SP 122 stands ready to resume operations of the first SP 120 in the event of a failure of the first SP or in the event of a system-wide failure at the first location.

In response to a failure of the first SP 120, the second SP 122 at the second location may resume operations of the first SP 120 by accessing the virtualized LUNs previously accessed by the first SP 120. The second SP 122 may also take over ownership of objects previously owned by the first SP 120, including, for example, VSPs originally owned by the first SP 120. Because configuration and site-specific data about the data storage apparatus 116 at the first site are stored in virtualized LUNs, which are accessible to all SPs in the metro cluster, the second SP 122 may also access the configuration and site-specific data and may thus establish its own configuration settings that mirror those of the first SP 122. Also, because the cache of the second SP 122 is coherent with that of the first SP 120, no data are lost in the transfer of operation from the first SP to the second SP.

After failover, data objects originally hosted on the first SP 120 are made available on the second SP 122. For example, VSPs operating on the first SP 120 when a failure occurs are instantiated on the second SP 122. Not only is their ownership changed to the second SP 122, but also any servers associated with the VSP (e.g., CIFS servers, NFS servers, etc.) are started on the second SP 122. The second SP 122 is then able to respond to host IOs directed to file systems of the VSPs within the particular VSP contexts. Thus, it is noted that, not only are data of the first SP 120 made available to the second SP 122, but also data objects, including associated servers, are made available and those servers operated on the second SP 122, so that the second SP 122 seamlessly and transparently resumes operation of the first SP 120.

The failover scenario described above presents an example wherein the first SP 120 fails and the second SP 122 takes over its operation. It is evident, however, that failover can occur in the reverse direction, as well, i.e., with the second SP 122 failing and the first SP 120 taking over. More generally, DDMs may be provided in the IO stacks of any or all SPs in the metro cluster, such that any SP in the metro cluster can fail and any of the remaining operating SPs can resume the operation of the failing SP.

Also, it is understood that virtualized LUNs are not owned by any particular SP but rather belong to the metro cluster as a whole. For example, any SP in the metro cluster can access any of the virtualized LUNs. In the above-described unified datapath architecture, the storage pool manager 232 in the front end 142 of the IO stack 140 can consume the virtualized LUNs across different sites and can allocate slices from those virtual LUNs to data objects stored as files in its lower-deck file systems. Thus, it is understood that virtual LUNs are not owned by any particular SP but are accessible to SPs in different sites at the same time.

Figure 12:
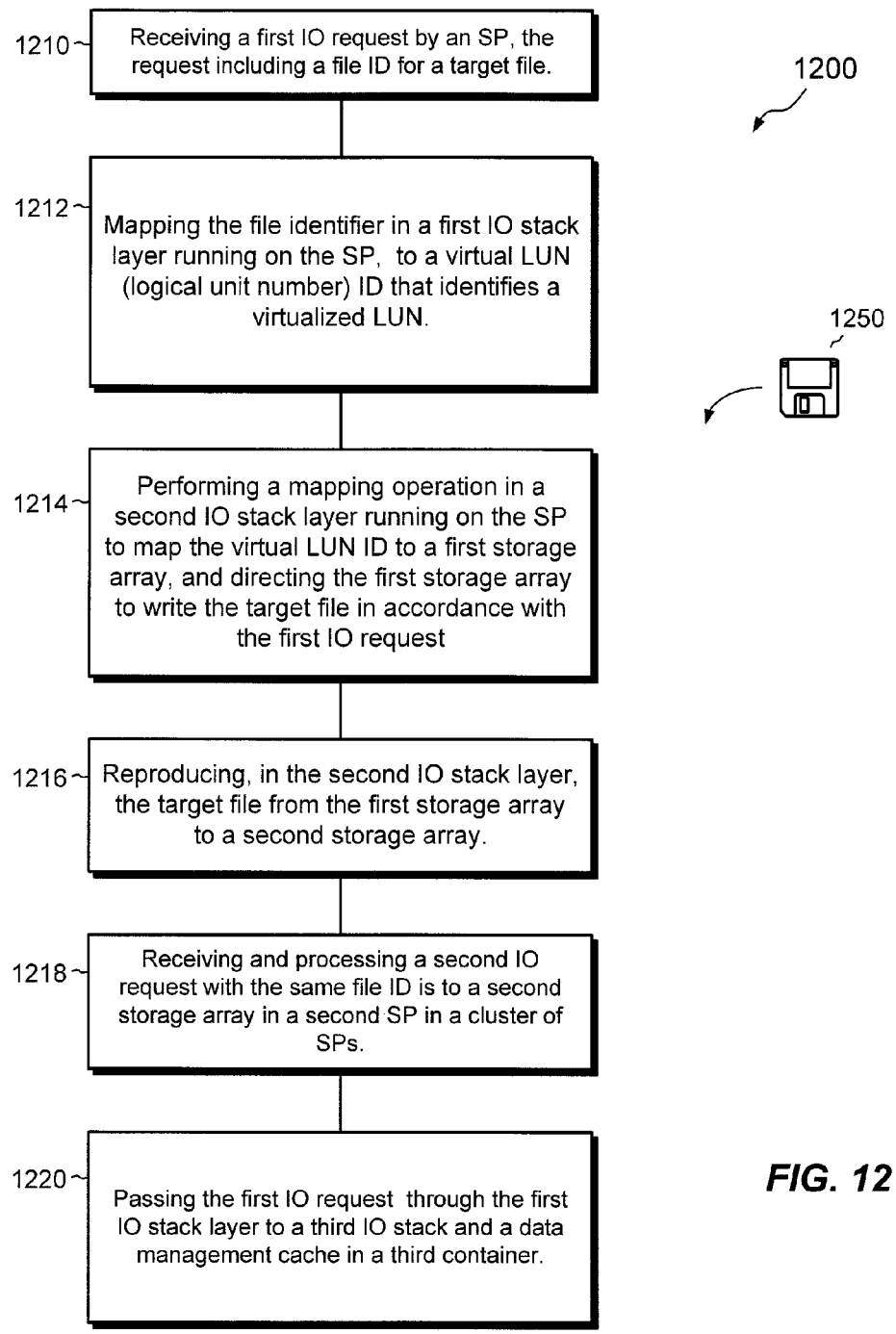
FIG. 12 is a flowchart showing an example process for managing host data using the example arrangement of FIG. 11.
Figure 13:
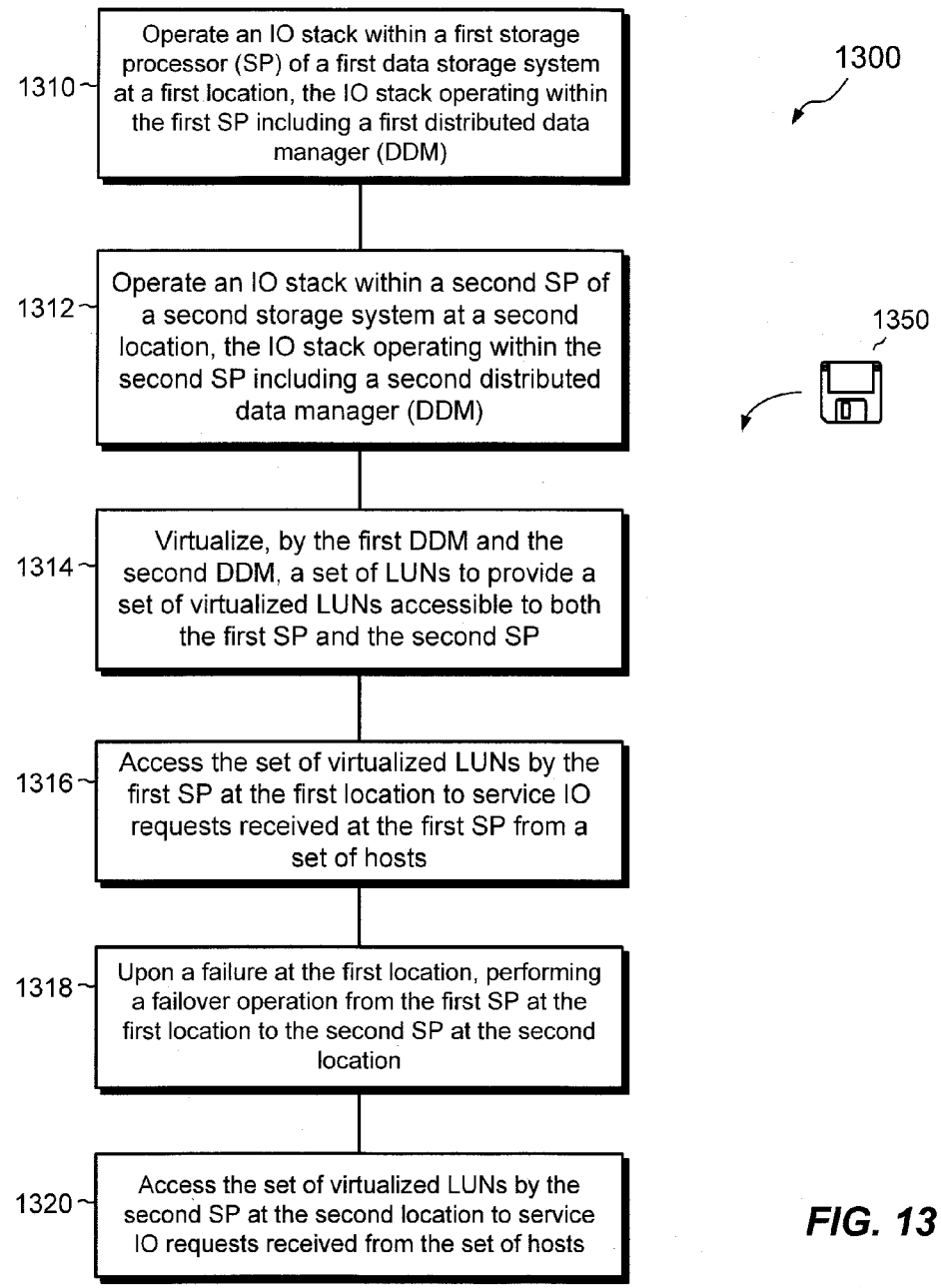
FIG. 13 is a flowchart showing an example process for performing site failover.

FIGS. 12 and 13 show example methods 1200 and 1300. The methods 1200 and 1300 are typically performed by the software constructs as shown in FIGS. 1, 2, and 11. The various acts of the methods 1200 and 1300 may be ordered in any suitable way. Accordingly, embodiments may be constructed in which acts are performed in orders different from those illustrated, which may include performing some acts simultaneously, even though the acts are shown as sequential in the illustrated embodiments.

FIG. 12 shows an example method 1200 for managing host data of a set of hosts in a data storage system. At step 1210, a host IO from one of hosts 110(1-4) is transmitted via the network 114 to the first SP 120 (as shown in FIG. 1). In an example, the first IO request is a request to write to a target file and includes a file ID for the target file. The file ID is a host system ID for the file and may include, for example, a file system ID, a path, and file name. It should be noted that the SP 120 may be processing many host IO requests in parallel.

At step 1212, the first IO stack layer operating in the container 132 maps the file identifier to a virtual LUN (logical unit number) ID that identifies a virtualized LUN. It should be noted that the first IO stack layer does not distinguish between virtualized LUNs and other LUNs (e.g., local LUNs). LUN virtualization is performed by the second IO stack layer within the second container 135.

At step 1214, a second IO stack layer, running in the second container 135 on the first SP 120, operates the DDM to map the virtual LUN from step 1212 to the first storage array 180 (e.g., to a LUN defined on the array 180) and directs the first storage array 180 to write the target file as requested. The DDM thus virtualizes the LUN in the storage 180 and renders it to the first IO stack layer with a location-independent ID.

At step 1216 the second IO stack layer, reproduces (e.g., copies or mirrors) the target file from the first storage array 180 to a second storage array 182 via a communications connection, for example the network 114 or the connection 121.

Reproducing the target file in the second storage array 182, or, for example, in any or all SPs of a cluster of SPs, provides data protection and the ability to failover to the second SP 122 should any operational problems occur at the first SP 120. Locating the second container 135 within the IO stack of the first SP 120 reduces the signal latency associated with host write IOs by eliminating the need to store designated data on the array 180 before acknowledging writes. Synchronous reproduction may allow failover to the second SP 122 to occur seamlessly and transparently to the host. Failover may be performed for various reasons, including traffic congestion at the first SP 120, at the first storage 180, due to an operational problem, due to cache flushing operations, and/or due to other reasons.

At step 1218, an IO request is directed to the second array 182. A second IO request is received that designates the same file identifier as the original target file, which may have been received at any time in the past. As with the first IO request, the second IO request is processed by the first IO stack layer in the first container 132 mapping the file identifier of the second IO request to the same virtual LUN ID. Here, however, the second IO stack layer, operating in the second container 135, maps the virtual LUN ID to the second storage array 182 (rather than to the first storage array 180), where the target file was reproduced. Then, the second IO request is processed by the second IO stack layer operating in the second container 137 directing the second storage array 182 to write to the target file in accordance with the second IO request. Since the file has been mirrored from the first array 180 to the second array 182, the host IO request is processed correctly, transparently, with no impact on the host operations. In this fashion distributed storage may improve the operation of a data storage system, and provide immediate backup and failover protection that is transparent to the host users. In case the second SP 122 is also overloaded or otherwise unable to handle the transfer from the first SP 120, cache coherency provided by the DDM between all the members of the cluster may allow the second container 135 to contact a member of the cluster that is available to synchronously write to the target file in accordance with the second IO request, and to provide an acknowledgement to the host of the success of the operation, as well as to maintain cache and memory coherency to the first SP 120 when the congestion or operational problem is resolved.

When the previously discussed first IO request was transmitted to the first SP 120, the data specified by the first IO request may have been cached by the unified cache manager 234 and/or incoming cache manager 224 (see FIG. 2), the unified cache manager 234 and/or incoming cache manager 224 in the first container 132 may cache the designated data in a write-through mode (rather than a write-back mode) which allows the IO request to pass uninterrupted (i.e., without the need to wait for acknowledgements) to the cache 143 in the third IO stack layer located in the third container 139 (see step 1220). In some examples, the unified cache manager 234 and incoming cache manager 224 are disabled altogether when operating with DDMs, so that the DDMs are able to control and manage cache coherency among different SPs without interference from the unified cache manager 234 and incoming cache manager 224.

The DDM manages cache coherency of the SP 120 and communicates with DDMs in the second SP 122 as well as in other SPs, such as the companion SPs 120B and 122B. The third IO stack layer operating in the third container 139 manages the data storage in the first storage array 180, and may also include a RAID manager to control and distribute the storage through the first storage 180 (as shown in the back-end 144 in FIG. 2). The DDM on the first SP 120 functions cooperatively with the DDM on the second SP 122 (and, in some examples, with DDMs of other SPs as well) to maintain cache coherency among the SPs.

Locating the cache 143 in the back-end of the IO stack provides improved data latency for reads and writes and improves synchronous mirroring operations. The cache 143 may examine the IO request to find if the file requested is already in cache and decrease the IO request response time by directly processing the IO request without delay for accessing the first storage 180 or other storage systems. It should be noted that having the cache 143 in the backend works equally well for all types of file-based objects.

FIG. 13 shows an example method 1300 of performing failover. The method 1300 may be performed in connection with the arrangement shown in FIG. 11.

At step 1310, an IO stack 140 is operated within a first storage processor (SP) 120 of a first data storage system 116 at a first location. The IO stack 140 operating within the first SP 120 includes a first distributed data manager (DDM).

At step 1312, an IO stack 140 is operated within a second SP 122 of a second storage system at a second location. The IO stack 140 operating within the second SP 122 includes a second distributed data manager (DDM).

At step 1314, the first DDM and the second DDM virtualize a set of LUNs to provide a set of virtualized LUNs accessible to both the first SP 120 and the second SP 122.

At step 1316, the first SP 120 at the first location accesses the set of virtualized LUNs to service IO requests received at the first SP 120 from a set of hosts (e.g., 110a-n).

At step 1318, upon a failure at the first location, a failover operation is performed from the first SP 120 at the first location to the second SP 122 at the second location.

At step 1320, the set of virtualized LUNs are accessed by the second SP 122 at the second location to service IO requests received from the set of hosts (e.g., 110a-n).

An improved technique has been described for supporting failover between SPs at different physical sites. The improved technique includes operating a distributed data manager (DDM) in an IO stack of both a first SP at a first site and a second SP at a second site. The DDMs of the first and second SPs cooperatively function to provide LUN virtualization that preserves virtual LUN IDs such that the first SP and the second SP can each access the same virtualized LUNs using the same virtual LUN IDs. In the event of a failure at the first site, the second SP at the second site may take over ownership of the virtualized LUNs originally owned by the first SP and access those same virtualized LUNs, including those storing configuration and site-specific data for the first site, as if those LUNs were local to the second SP.

As used throughout this document, the words "comprising," "including," and "having" are intended to set forth certain items, steps, elements, or aspects of something in an open-ended fashion. Although certain embodiments are disclosed herein, it is understood that these are provided by way of example only and the invention is not limited to these particular embodiments. In addition, the word "set" as used herein indicates one or more of something, unless a statement is made to the contrary.

Having described certain embodiments, numerous alternative embodiments or variations can be made. For example, the improvements or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as media 1250 and 1350 in FIGS. 12 and 13). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Further, although features are shown and described with reference to particular embodiments hereof, such features may be included in any of the disclosed embodiments and their variants. Thus, it is understood that features disclosed in connection with any embodiment can be included as variants of any other embodiment, whether such inclusion is made explicit herein or not.

Those skilled in the art will therefore understand that various changes in form and detail may be made to the embodiments disclosed herein without departing from the scope of the invention.

Additional Information:

Conventional distributed storage for data federation generally involves the use of multiple hardware systems located in different geographic locations. For example, a data storage apparatus at a first geographic location may connect over a network to data federation equipment at a second geographic location. In a typical arrangement, the data storage apparatus and data federation equipment work together in a synchronous manner. For instance, the data storage apparatus receives an IO request from a host designating data to be written to a block-based data object, such as a LUN. Prior to writing the data specified in the IO request to its local storage, the data storage apparatus sends the IO request to the data federation equipment over the network. The data federation equipment stores the data designated in the IO request to remote storage (e.g., at the second geographic location or at some other location) and sends an acknowledgement back to the data storage apparatus that the remote write is complete. The data storage apparatus may then store the designated data to local storage, e.g., to an array within the data storage apparatus at the first geographic location. The data federation equipment thus effectively mirrors the data stored at the first location in real time. The data federation equipment also provides other useful services, such as LUN abstraction and cache coherency.

Unfortunately, many data federation systems operate only on block-based data objects, such as LUNs. Operating systems for managing file-based objects, such as host file systems, typically have internal limitations that render them unable to function with data federation equipment. Primarily, these limitations involve an inability of file-based data storage operating systems to tolerate long delays associated with both accessing the remote system for data mirroring and storing data specified in IO requests in local non-volatile storage. File-based operating systems typically require fast responses to reads and writes and cannot function with the relatively long latencies incurred when synchronously mirroring IO requests to remote data federation equipment and also storing the data to local nonvolatile storage.

In contrast with the conventional approach, an improved distributed storage technique provides a distributed data manager within an IO stack of a first storage processor (SP) of a data storage apparatus at a first location. The distributed data manager operates in coordination with a distributed data manager running on a second SP at a second location to persist, at the second location, data specified in host write IOs received at the first location and also to store the data to local persistent cache at the first location. By avoiding long latencies in storing data to local nonvolatile storage, the distributed data manager is able to provide fast responses to writes and enables operation for file-based objects.

In some examples, the IO stack of the SP includes a front-end that represents file-based objects in the form of lower-deck files. For example, host file systems, file-based vVols (virtual volumes), VMDKs, and so forth, are all stored as respective files in file systems accessible to the SP. With different file-based objects rendered in this common form, the distributed data manager may operate at a level of the IO stack below the front end to perform data federation services on these respective files agnostically to the content that these files represent. Thus, the distributed data manager operates the same way for all data objects, without distinguishing between different types of data objects, which are all represented equivalently as files.

In an example, the improved technique increases storage efficiency of managing host data of a set of hosts in a data storage system by receiving a first IO (input/output) request at a SP designating a file identifier that identifies a target file to be written. The file ID of the IO request is mapped, by a first IO stack layer running on the SP, to a virtual LUN ID that identifies a virtualized LUN, thus enabling efficient use of distributed storage resources. A second IO stack layer running on the SP maps the virtual LUN ID to a first storage array connected to the SP and directs the first storage array to write the target file in accordance with the first IO request. The second IO stack layer copies the target file from the first storage array to a second storage array in a remote SP. When a second IO request designating the file identifier of the target file is received by the SP, the SP maps the file identifier (using the first IO stack layer) to the virtual LUN ID and then maps the virtual LUN ID to the second storage array (using the second IO stack layer). The second IO stack layer directs the second storage array to write to the target file in accordance with the second IO request. Thus, the second IO stack layer allows the underlying storage locations of host data to be changed transparently to the host, which may continue to access host data using the same virtual LUN ID as before.

In some examples, the mapping by the first IO stack layer is executed in a first container, the first container providing a first isolated userspace execution environment on the SP, and the second IO stack layer is executed in a second container, the second container being separate from the first container and providing a second isolated userspace execution environment on the SP.

In some examples, the first IO stack layer divides the virtual LUN into a set of storage slices and allocates the set of storage slices to a lower-deck file system of the SP. The IO stack represents the host file system as a lower-deck file composed from the set of slices, maps the file identifier to the virtual LUN ID that identifies the virtualized LUN, and maps the file identifier to a particular set of block locations within the slices allocated to the lower-deck file system.

What is claimed is:

1. A method of managing data in a data storage system, comprising:
    operating an IO (Input/Output) stack within a first storage processor (SP) of a first data storage system at a first location, the IO stack operating within the first SP including (i) a first container including a mapping layer and (ii) a second container including a first distributed data manager (DDM), the first DDM in the second container virtualizing a LUN served from a local storage array and rendering the LUN to the mapping layer in the first container using a location-independent LUN ID;
    operating an IO stack within a second SP of a second storage system at a second location, the IO stack operating within the second SP including a second distributed data manager (DDM), the second DDM enabling the second SP to access the virtualized LUN served from the local storage array of the first SP using the location-independent LUN ID;
    accessing the virtualized LUN by the first SP at the first location to service IO requests received at the first SP from a set of hosts;
    upon a failure at the first location, performing a failover operation from the first SP at the first location to the second SP at the second location; and accessing the virtualized LUN by the second SP at the second location to service IO requests received from the set of hosts, wherein the first container is a first software process running on an operating system kernel of the first SP and providing a first isolated userspace environment on the first SP, wherein the second container is a second software process running on the operating system kernel of the first SP and providing a second isolated userspace environment on the first SP, and wherein the first container and the second container communicate with each other using inter-process communication (IPC) within the first SP.

2. The method of claim 1, further comprising, prior to the failure at the first location, synchronously mirroring data specified in host write IOs received by the first SP at the first location to the second SP at the second location.

3. The method of claim 2, further comprising, prior to the failure at the first location, maintaining cache coherency between a cache of the first SP at the first location and a cache of the second SP at the second location.

4. The method of claim 1, wherein the virtualized LUN stores both host data and configuration and site-specific data of the first location, and wherein accessing the virtualized LUN by the second SP at the second location includes accessing the configuration and site-specific data of the first location by the second SP at the second location.

5. The method of claim 1, wherein performing the failover operation from the first SP at the first location to the second SP at the second location includes the second location accessing the virtualized LUN previously accessed by the first SP.

6. The method of claim 5, wherein performing the failover operation from the first SP at the first location to the second SP at the second location further includes the second location taking over ownership of the virtualized storage processors (VSPs) previously owned by the first SP.

7. The method of claim 1, wherein the IO stack operating within the second SP includes (i) a first container including a mapping layer configured to map IO requests from the set of hosts to requests directed to the virtualized LUN, and (ii) a second container including the second DDM, wherein the first container on the second SP is a first software process running on an operating system kernel of the second SP and providing a first isolated userspace environment on the second SP, wherein the second container on the second SP is a second software process running on the operating system kernel of the second SP and providing a second isolated userspace environment on the second SP, and wherein the first container on the second SP and the second container on the second SP communicate with each other using inter-process communication (IPC) within the second SP.

8. The method of claim 1, where, prior to the failure at the first location, the method includes:

receiving, by the first SP from a host, an IO request specifying a write of specified data to the LUN;

mapping, by the mapping layer in the first container on the first SP, the IO request to a corresponding mapped request to write to the virtualized LUN;

synchronously mirroring, by the first DMM in the second container on the first SP, the mapped request to the second SP;

receiving, by the first DMM on the first SP, an acknowledgment from the second SP that the second SP has persisted the specified data in a persistent cache at the second location;

after receiving the acknowledgement from the second SP, persisting, by the first SP, the specified data in a persistent cache at the first location; and after persisting the specified data in the persistent cache at the first location, acknowledging completion of the IO request to the host.

9. The method of claim 8, wherein persisting the specified data by the first SP includes writing the data to DRAM on the first SP and mirroring the specified data to DRAM on another SP at the first location.

10. A computerized system for of managing data, comprising:

a first SP (storage processor) in a first data storage system at a first location;

a second SP in a second data storage system at a second location, wherein the first and SP and the second SP together include control circuitry constructed and arranged to:

operate an IO (Input/Output) stack within the first SP, the IO stack including (i) a first container including a mapping layer and (ii) a second container including a first distributed data manager (DDM), the first DDM in the second container configured to virtualize a LUN served from a local storage array and render the LUN to the mapping layer in the first container using a location-independent LUN ID;

operate an IO stack within the second SP, the IO stack within the second SP including a second DDM, the second DDM configured to enable the second SP to access the virtualized LUN served from the local storage array of the first SP using the location-independent LUN ID;

access the virtualized LUN by the first SP at the first location to service IO requests received at the first SP from a set of hosts;

upon a failure at the first location, perform a failover operation from the first SP at the first location to the second SP at the second location; and access the virtualized LUN by the second SP at the second location to service IO requests received from the set of hosts, wherein the first container is a first software process configured to run on an operating system kernel of the first SP to provide a first isolated userspace environment on the first SP, wherein the second container is a second software process configured to run on the operating system kernel of the first SP to provide a second isolated userspace environment on the first SP, and wherein the first container and the second container communicate with each other using inter-process communication (IPC) within the first SP.

11. The computerized system of claim 10, wherein the virtualized LUN stores both host data and configuration and site-specific data of the first location, and wherein the control circuitry, constructed and arranged to access the virtualized LUN by the second SP at the second location, is further constructed and arranged to access the configuration and site-specific data of the first location by the second SP at the second location.

12. The computerized system of claim 11, wherein the control circuitry, constructed and arranged to perform the failover operation from the first SP at the first location to the second SP at the second location, is further constructed and arranged to take over, by the second SP, ownership of the virtualized storage processors (VSPs) previously owned by the first SP.

13. The computerized system of claim 12,
wherein the IO stack within the second SP includes (i) a first container including a mapping layer configured to map IO requests from the set of hosts to requests directed to the virtualized LUN, and (ii) a second container including the second DDM,
wherein the first container on the second SP is a first software process configured to run on an operating system kernel of the second SP to provide a first isolated userspace environment on the second SP,
wherein the second container on the second SP is a second software process configured to run on the operating system kernel of the second SP to provide a second isolated userspace environment on the second SP,
and wherein the first container on the second SP and the second container on the second SP are configured to communicate with each other using inter-process communication (IPC) within the second SP.

14. The computerized system of claim 1, where, the control circuitry is further constructed and arranged to:
receive, by the first SP from a host, an IO request specifying a write of specified data to the LUN;
map, by the mapping layer in the first container on the first SP, the IO request to a corresponding mapped request to write to the virtualized LUN;
synchronously mirror, by the first DMM in the second container on the first SP, the mapped request to the second SP;
receive, by the first DMM on the first SP, an acknowledgment from the second SP that the second SP has persisted the specified data in a persistent cache at the second location;
after receipt of the acknowledgement from the second SP, persist, by the first SP, the specified data in a persistent cache at the first location; and
after persisting the specified data in the persistent cache at the first location, acknowledge completion of the IO request to the host.

15. The computerized system of claim 8, wherein the control circuitry, constructed and arranged to persist the specified data by the first SP, is further constructed and arranged to write the data to DRAM on the first SP and mirror the specified data to DRAM on another SP at the first location.

16. A computer program product including a set of non-transitory, computer-readable media storing instructions which, when executed by control circuitry of a first storage processor in a first data storage system at a first location and a second storage processor in a second data storage system at a second location, cause the first storage processor and the second storage processor to perform method of managing data, the method comprising:
operating an IO (Input/Output) stack within the first storage processor (SP), the IO stack operating within the first SP including (i) a first container including a mapping layer and (ii) a second container including a first distributed data manager (DDM), the first DDM in the second container virtualizing a LUN served from a local storage array and rendering the LUN to the mapping layer in the first container using a location-independent LUN ID;
operating an IO stack within the second SP, the IO stack operating within the second SP including a second distributed data manager (DDM), the second DDM enabling the second SP to access the virtualized LUN served from the local storage array of the first SP using the location-independent LUN ID;
accessing the virtualized LUN by the first SP at the first location to service IO requests received at the first SP from a set of hosts;
upon a failure at the first location, performing a failover operation from the first SP at the first location to the second SP at the second location; and
accessing the virtualized LUN by the second SP at the second location to service IO requests received from the set of hosts,
wherein the first container is a first software process running on an operating system kernel of the first SP and providing a first isolated userspace environment on the first SP,
wherein the second container is a second software process running on the operating system kernel of the first SP and providing a second isolated userspace environment on the first SP,
and wherein the first container and the second container communicate with each other using inter-process communication (IPC) within the first SP.

17. The computer program product of claim 16, wherein the method further comprises, prior to the failure at the first location, synchronously mirroring data specified in host write IOs received by the first SP at the first location to the second SP at the second location.

18. The computer program product of claim 16,
wherein the IO stack operating within the second SP includes (i) a first container including a mapping layer configured to map IO requests from the set of hosts to requests directed to the virtualized LUN, and (ii) a second container including the second DDM,
wherein the first container on the second SP is a first software process running on an operating system kernel of the second SP and providing a first isolated userspace environment on the second SP,
wherein the second container on the second SP is a second software process running on the operating system kernel of the second SP and providing a second isolated userspace environment on the second SP,
and wherein the first container on the second SP and the second container on the second SP communicate with each other using inter-process communication (IPC) within the second SP.

19. The computer program product of claim 16, where, prior to the failure at the first location, the method further includes:
receiving, by the first SP from a host, an IO request specifying a write of specified data to the LUN;
mapping, by the mapping layer in the first container on the first SP, the IO request to a corresponding mapped request to write to the virtualized LUN;
synchronously mirroring, by the first DMM in the second container on the first SP, the mapped request to the second SP;
receiving, by the first DMM on the first SP, an acknowledgment from the second SP that the second SP has persisted the specified data in a persistent cache at the second location;
after receiving the acknowledgement from the second SP, persisting, by the first SP, the specified data in a persistent cache at the first location; and after persisting the specified data in the persistent cache at the first location, acknowledging completion of the IO request to the host.

20. The computer program product of claim 19, wherein persisting the specified data by the first SP includes writing the data to DRAM on the first SP and mirroring the specified data to DRAM on another SP at the first location.

\* \* \* \* \*